Sept. 18, 1928.

G. A. BOUVIER 1,684,532

METHOD OF AND APPARATUS FOR FORMING STRANDED ARTICLES

Filed Jan. 12, 1926     19 Sheets-Sheet 1

Inventor:
George A. Bouvier
by A. A. Pattison Att'y.

Sept. 18, 1928.
G. A. BOUVIER
1,684,532
METHOD OF AND APPARATUS FOR FORMING STRANDED ARTICLES
Filed Jan. 12, 1926
19 Sheets-Sheet 2

Inventor:
George A. Bouvier
by H. A. [signature]
Att'y

Inventor:
George A. Bouvier

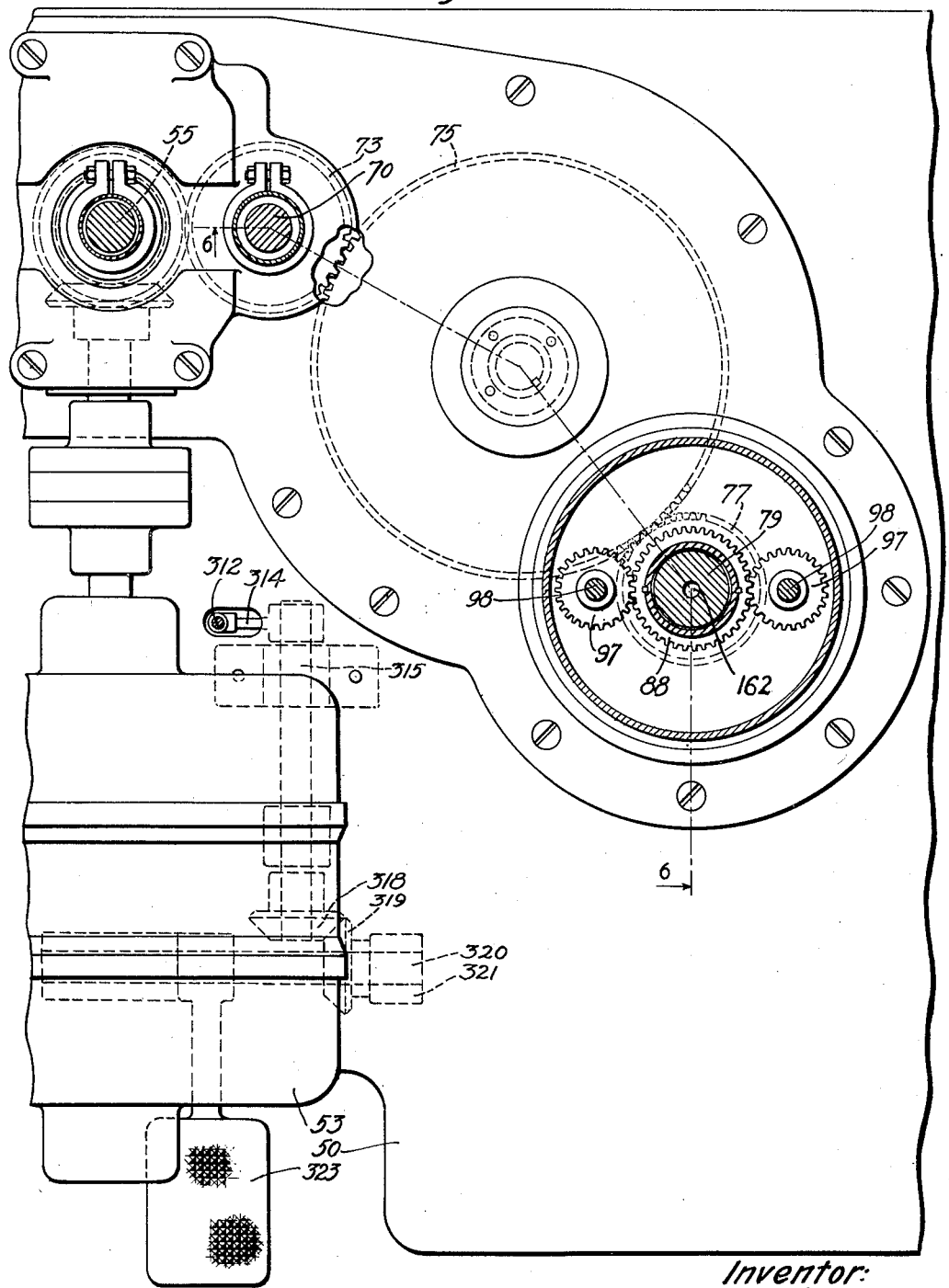

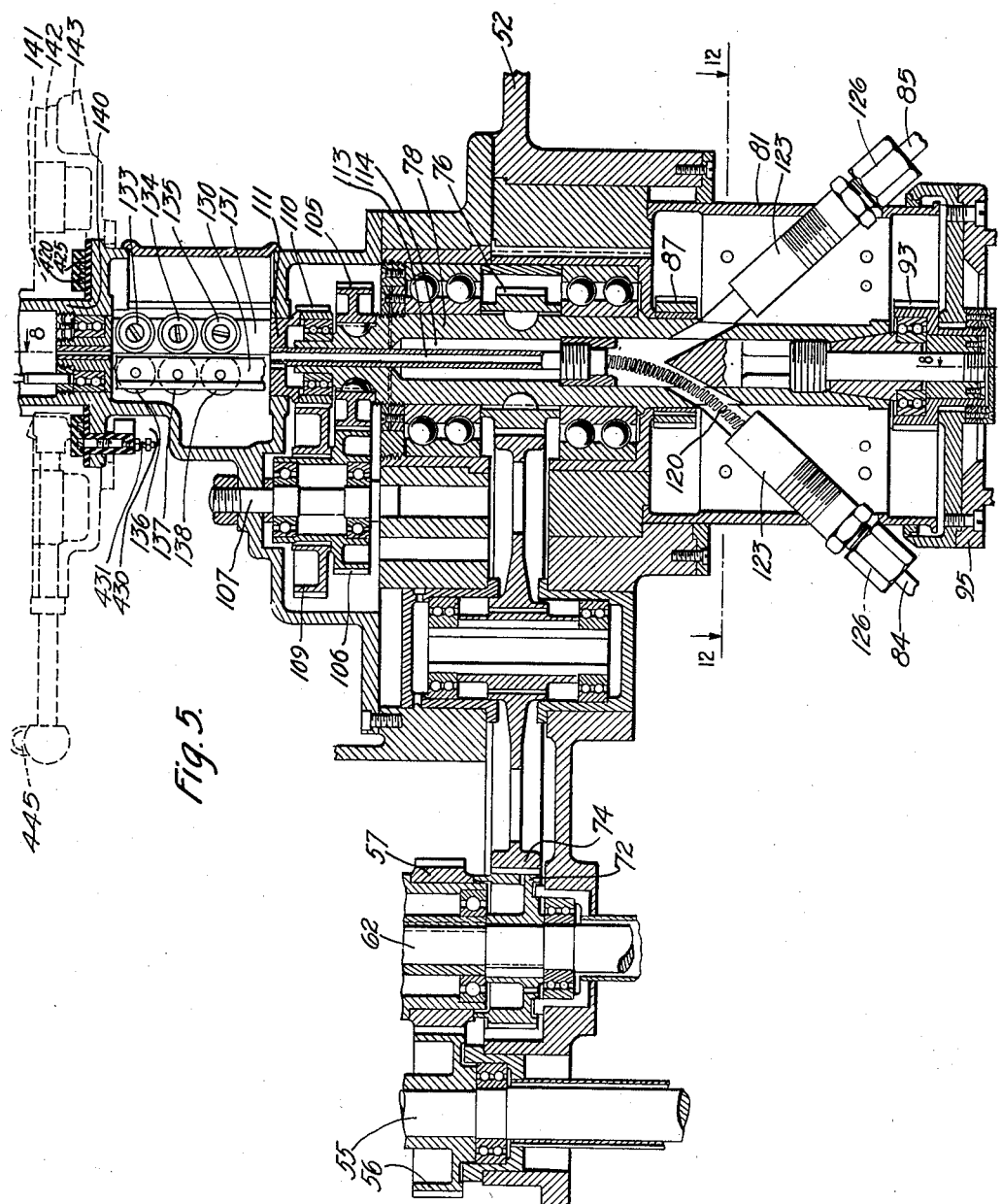

Sept. 18, 1928.  
G. A. BOUVIER  
1,684,532  
METHOD OF AND APPARATUS FOR FORMING STRANDED ARTICLES  
Filed Jan. 12, 1926  19 Sheets-Sheet 6
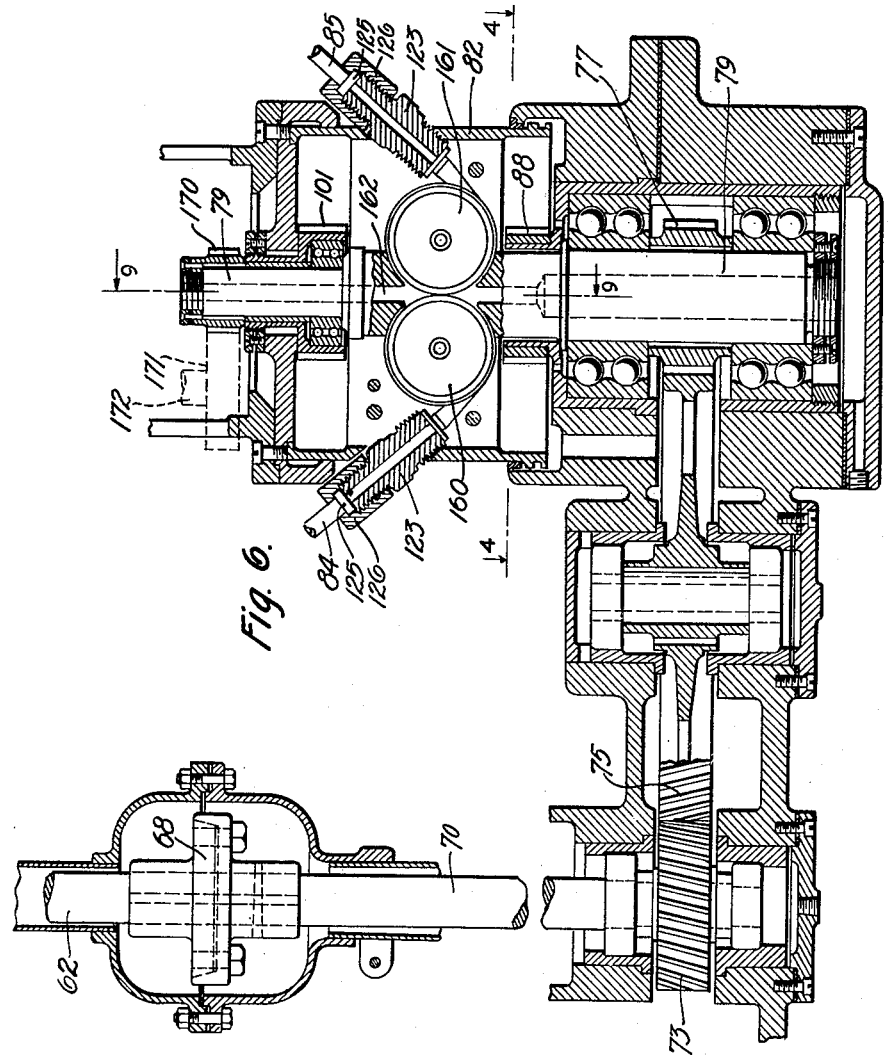

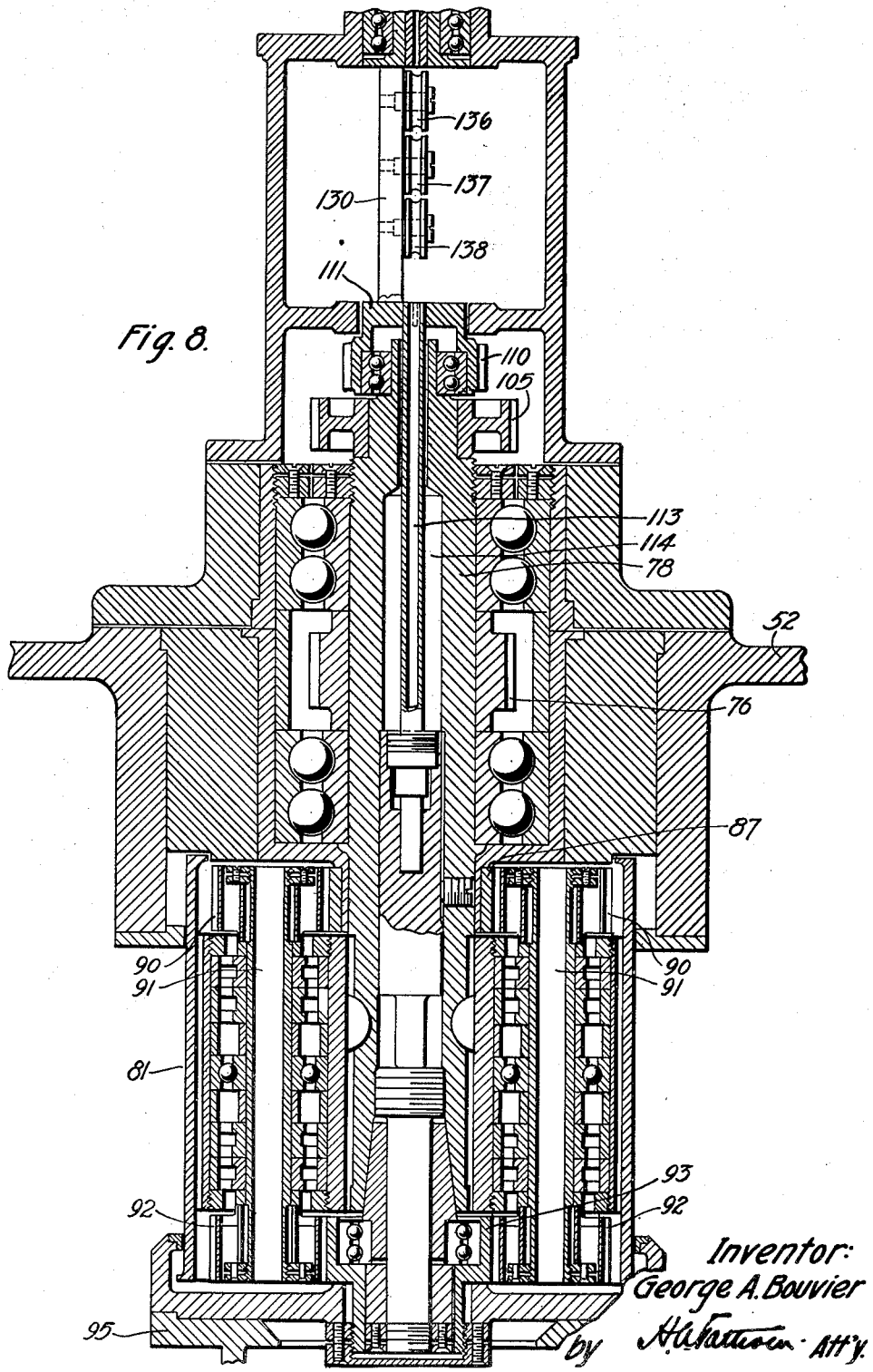

Sept. 18, 1928.

G. A. BOUVIER 1,684,532

METHOD OF AND APPARATUS FOR FORMING STRANDED ARTICLES

Filed Jan. 12, 1926 19 Sheets-Sheet 8

Inventor:
George A. Bouvier
by *H. A. Vattuone* Att'y.

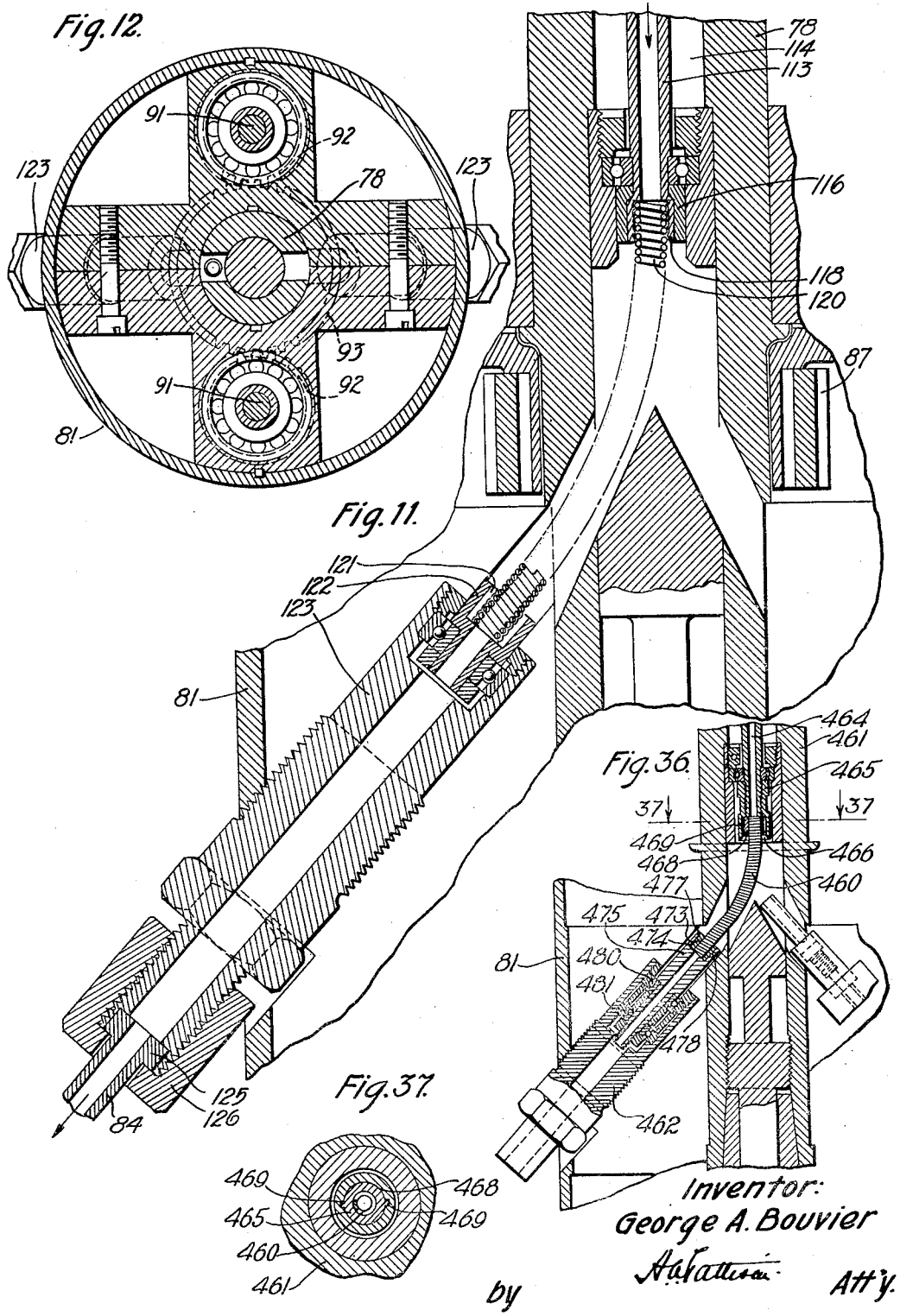

Sept. 18, 1928.

G. A. BOUVIER 1,684,532

METHOD OF AND APPARATUS FOR FORMING STRANDED ARTICLES

Filed Jan. 12, 1926

Inventor:
George A. Bouvier by  *H. A. Patterson* Att'y.

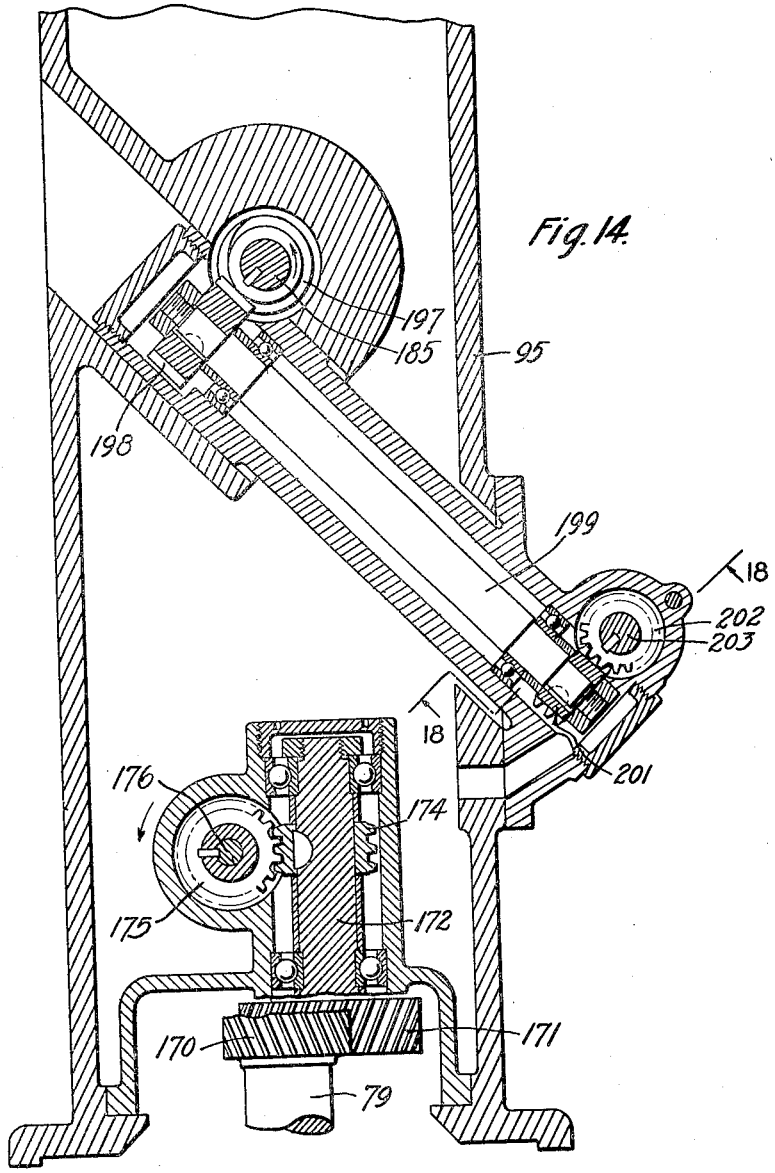

Sept. 18, 1928.  
G. A. BOUVIER  
1,684,532  
METHOD OF AND APPARATUS FOR FORMING STRANDED ARTICLES  
Filed Jan. 12, 1926     19 Sheets-Sheet 12
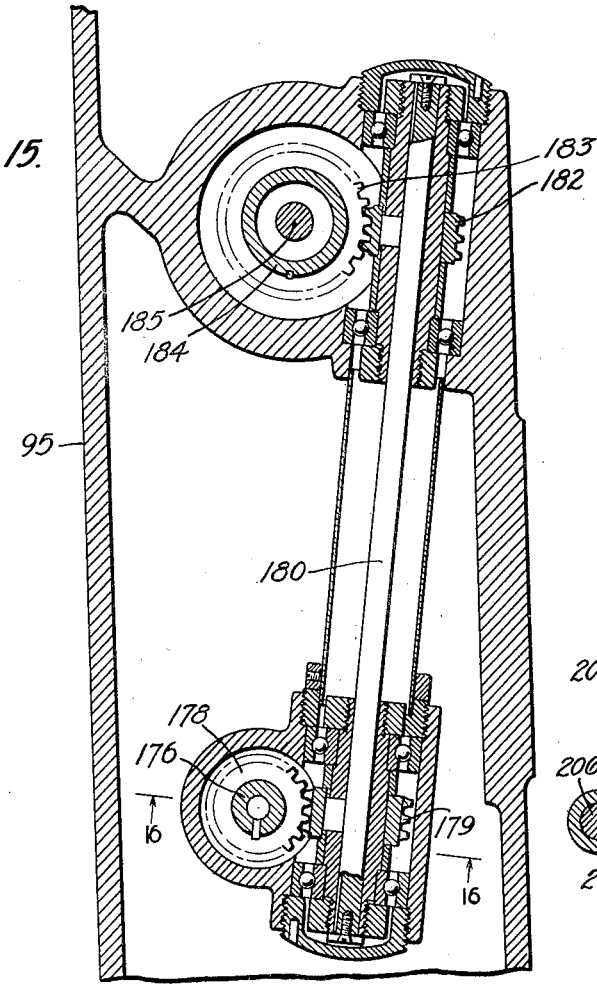
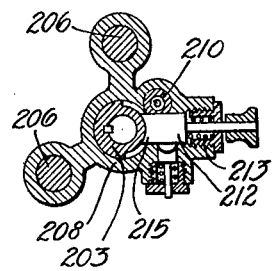
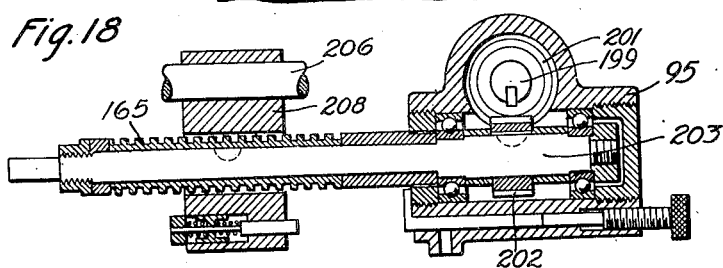
*Inventor:*
*George A. Bouvier*
by *H.A. Pattison* Att'y Sept. 18, 1928.

G. A. BOUVIER 1,684,532

METHOD OF AND APPARATUS FOR FORMING STRANDED ARTICLES

Filed Jan. 12, 1926     19 Sheets-Sheet 13

Inventor:
George A. Bouvier
by   *A. A. Sattrom*   Att'y.

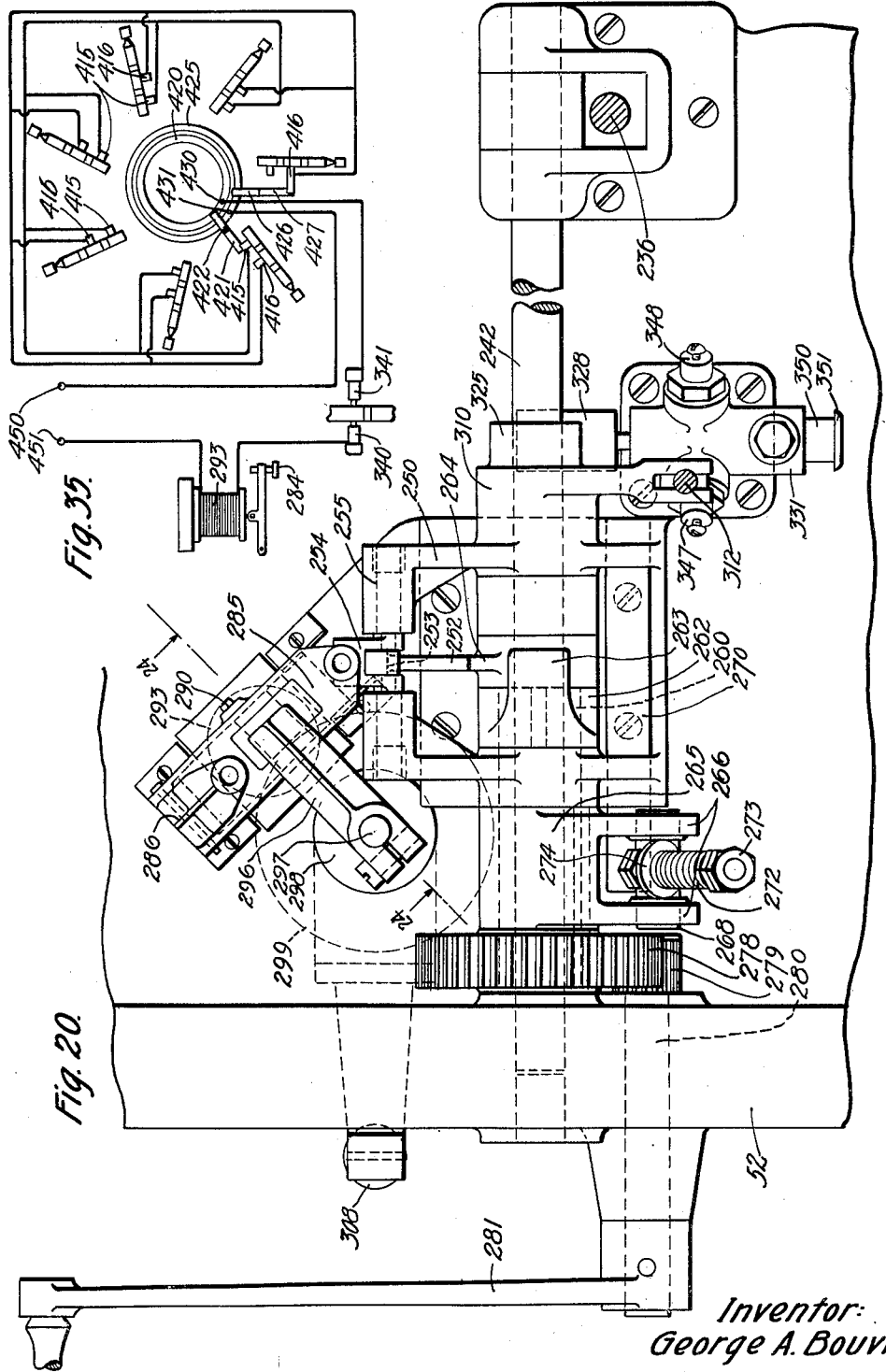

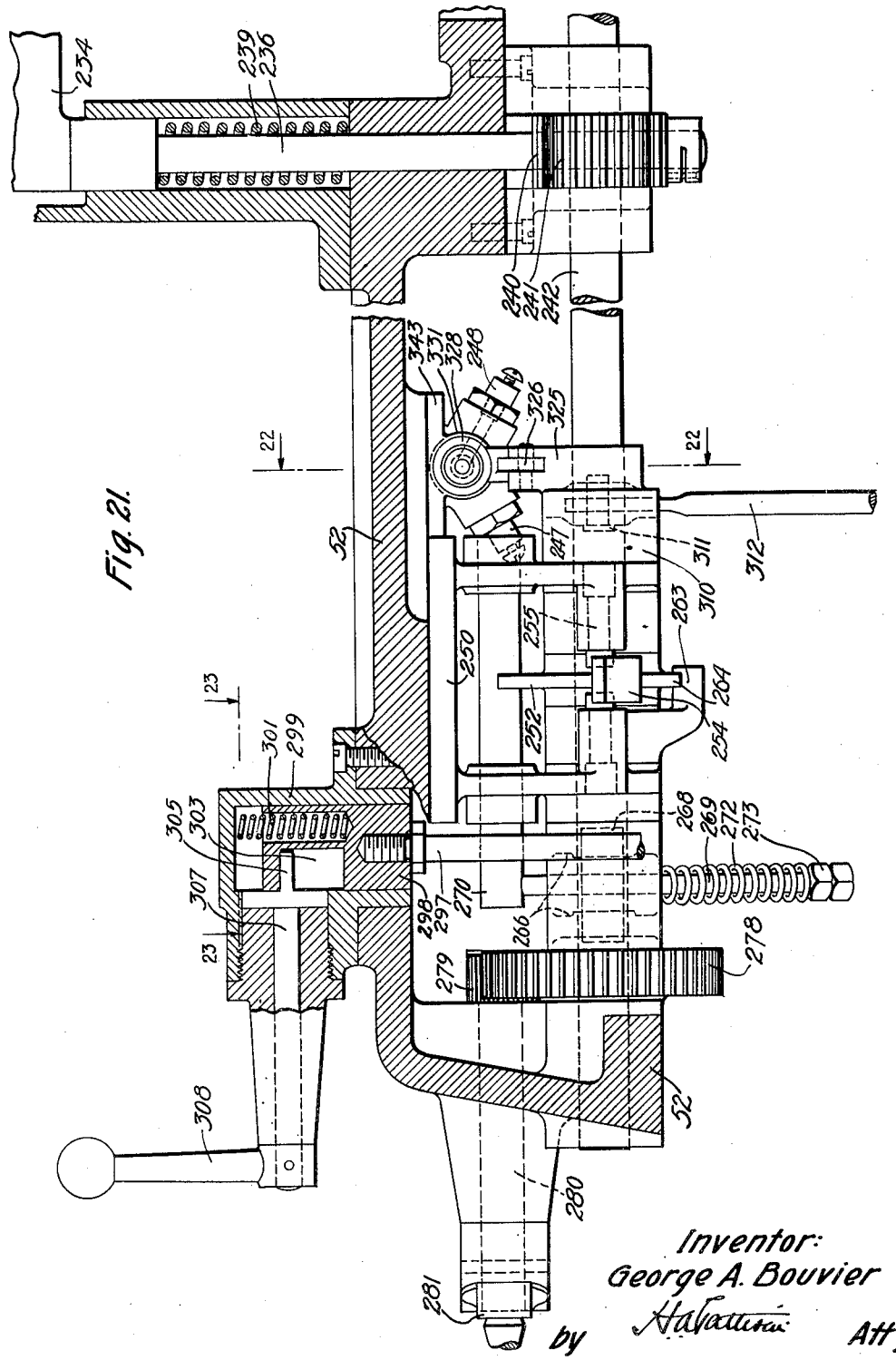

Sept. 18, 1928.
G. A. BOUVIER
1,684,532
METHOD OF AND APPARATUS FOR FORMING STRANDED ARTICLES
Filed Jan. 12, 1926 19 Sheets-Sheet 16
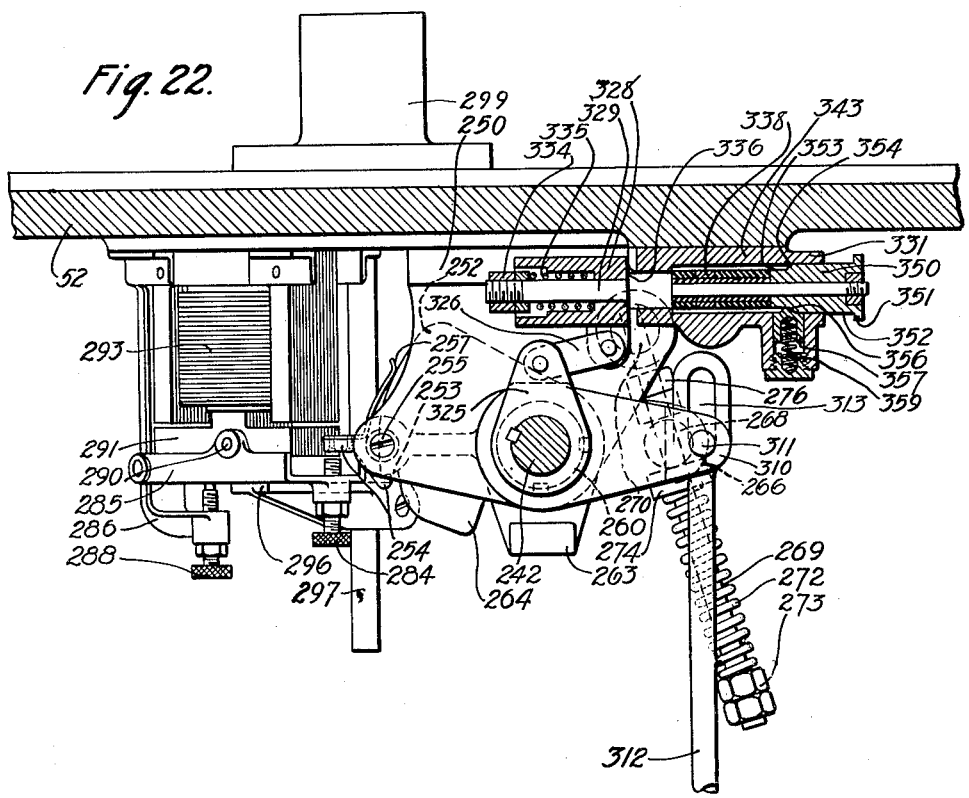
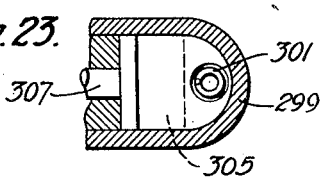
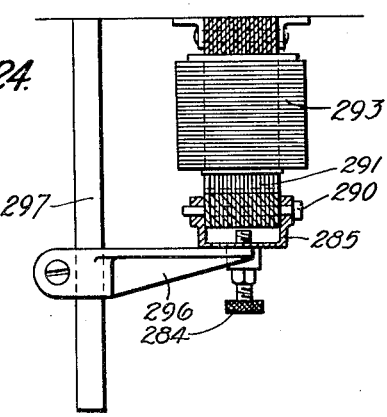
Inventor:
George A. Bouvier
by H. A. Watson Att'y.

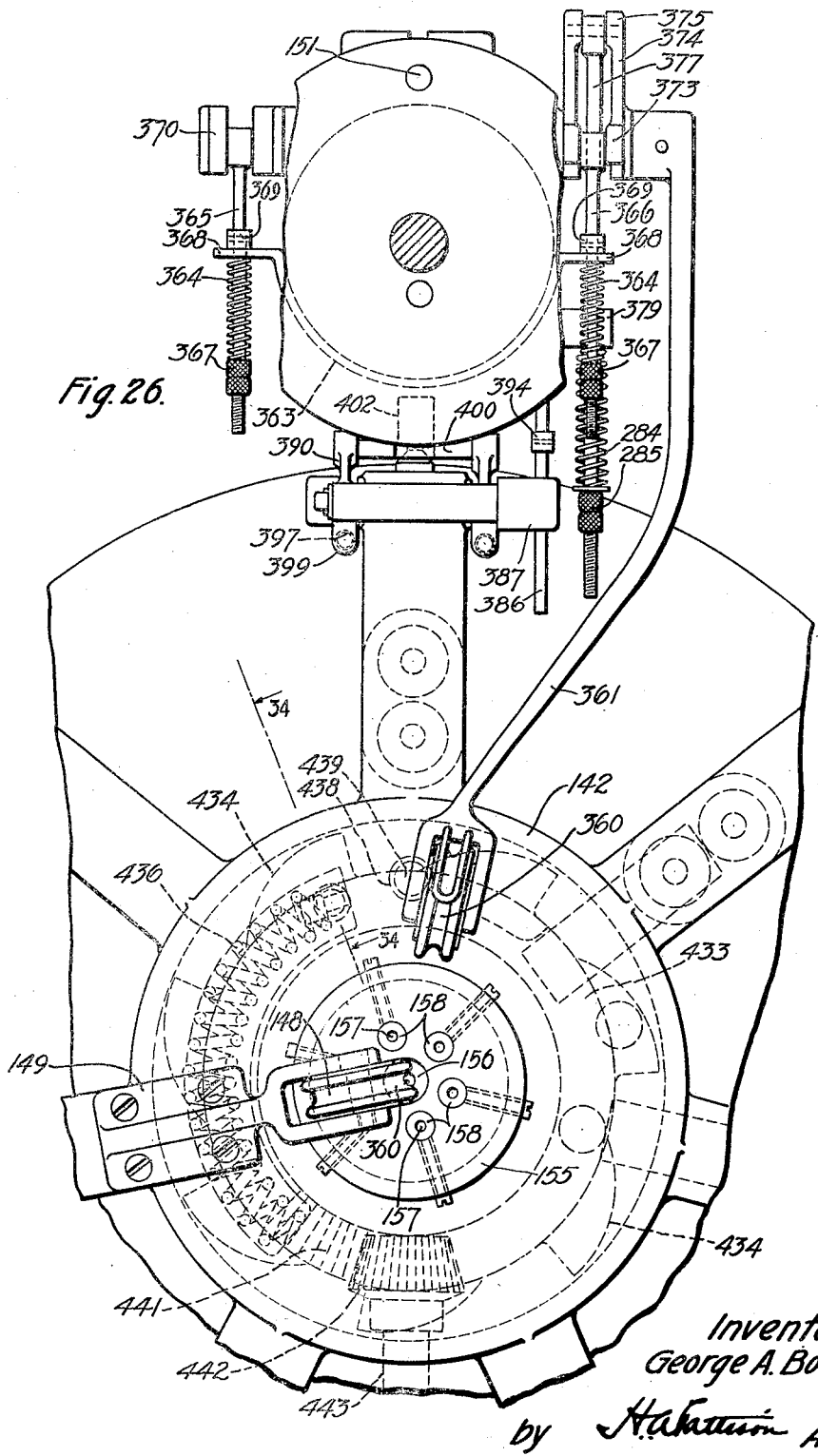

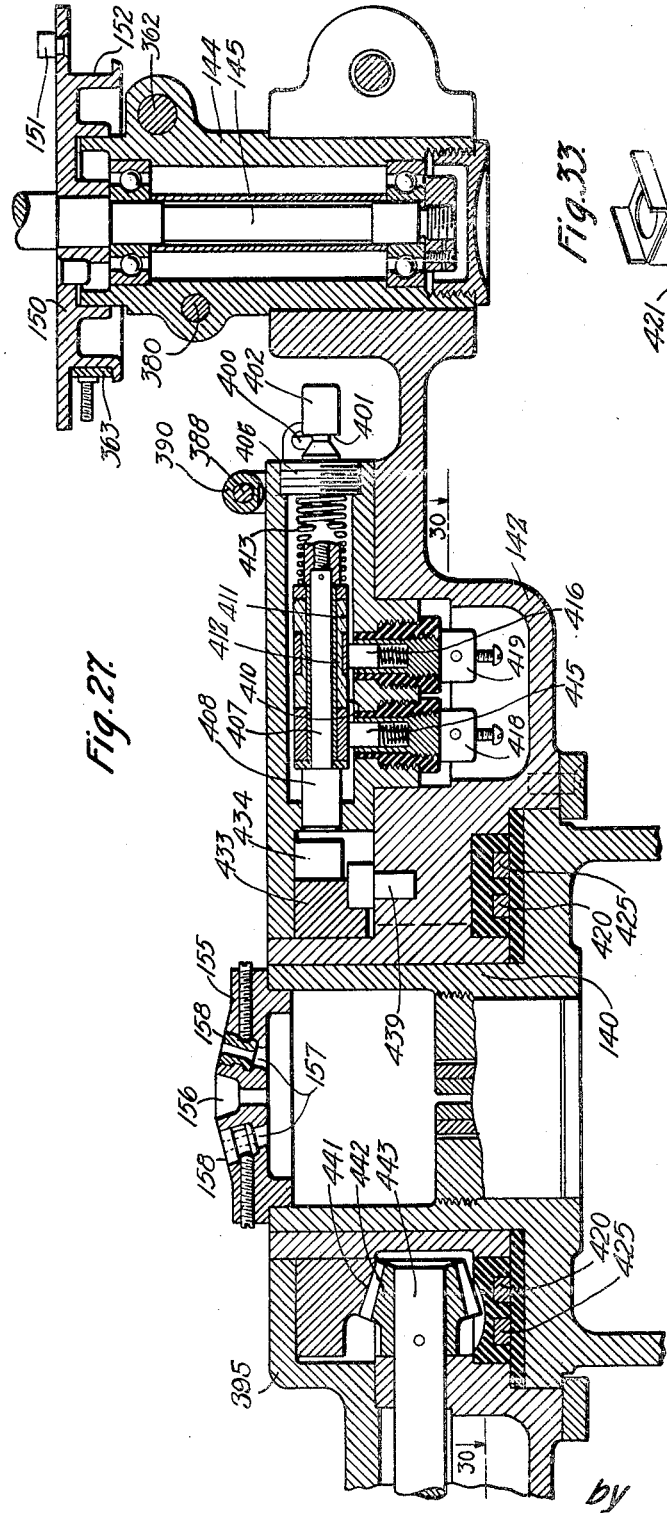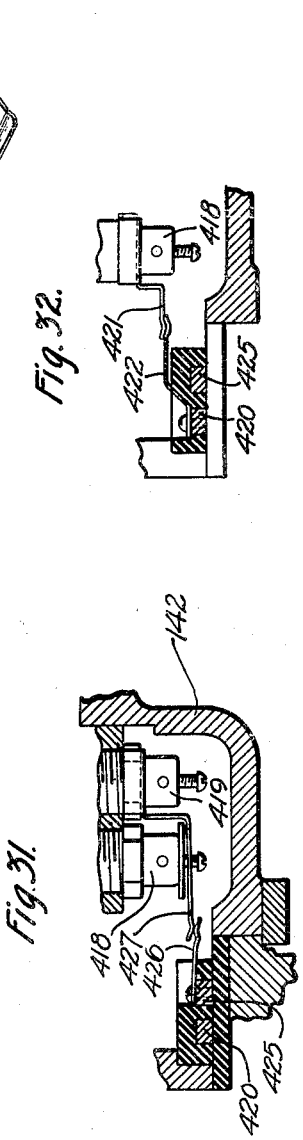

Sept. 18, 1928.
G. A. BOUVIER
1,684,532
METHOD OF AND APPARATUS FOR FORMING STRANDED ARTICLES
Filed Jan. 12, 1926    19 Sheets-Sheet 19
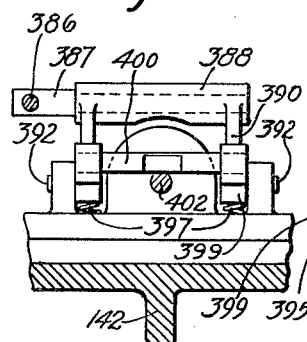
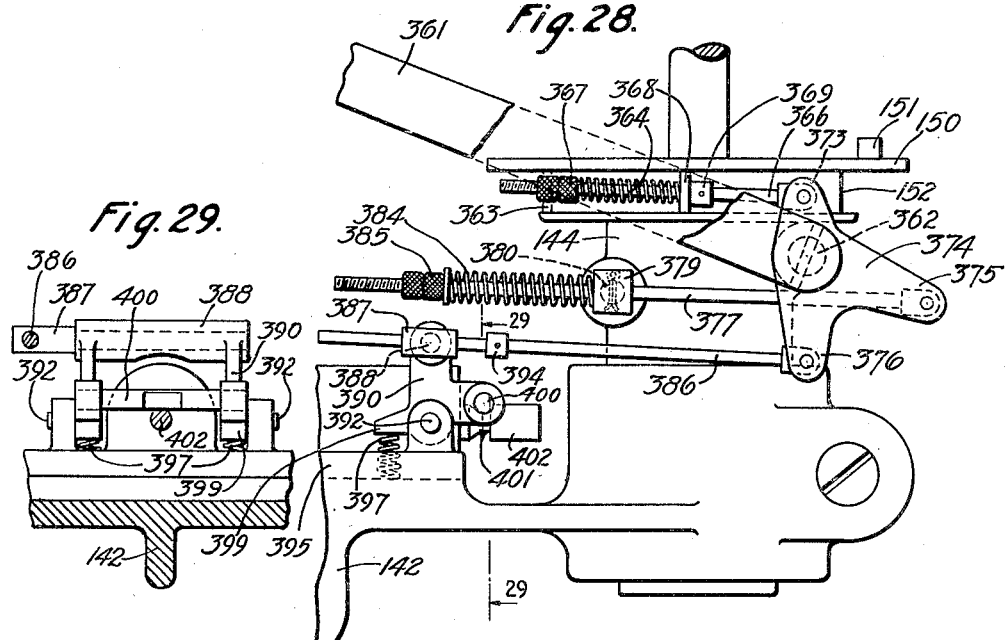
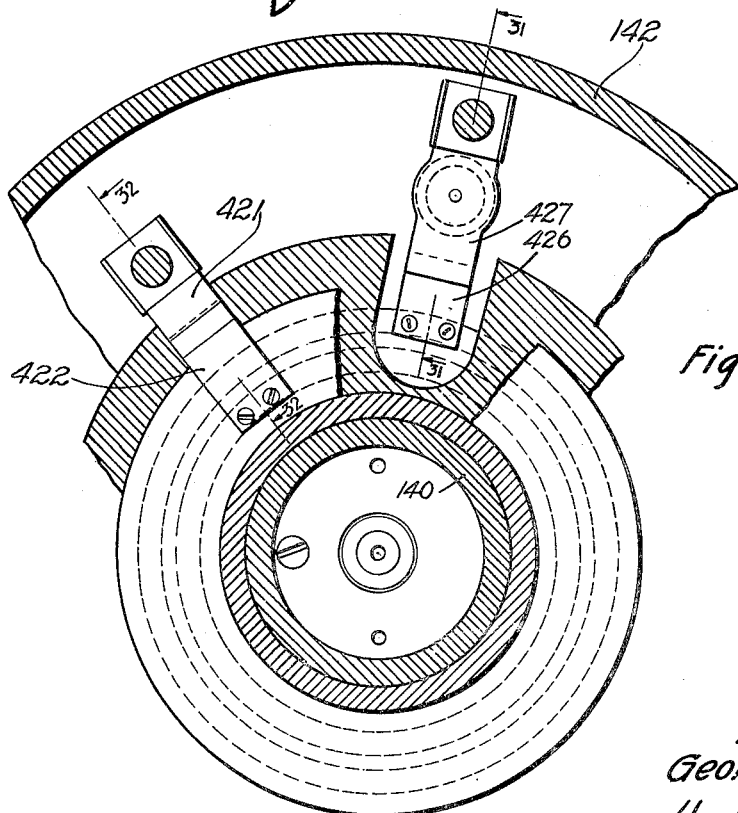
Inventor:
George A. Bouvier
by H. A. Faucett Att'y Patented Sept. 18, 1928.

1,684,532

UNITED STATES PATENT OFFICE.

GEORGE ALFRED BOUVIER, OF OAK PARK, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR FORMING STRANDED ARTICLES.

Application filed January 12, 1926. Serial No. 80,709.

This invention relates to a method of and apparatus for forming stranded articles, and its primary object is the provision of a method of and apparatus for evenly distributing and twisting one or more strands around another at a high rate of speed so as to lessen the cost of producing stranded articles.

Improved apparatus embodying one form of the invention produces a flexible electrical conductor by serving a cotton core with threads which have been previously served with tinsel, the cotton core and tinsel served threads being drawn by a capstan through a plurality of twisting mechanisms revolving at different speeds which progressively revolve each portion of the core twice around its longitudinal axis as the core passes through them and cause a turn of each tinsel served thread to be applied to the core for each revolution of the faster revolving twisting mechanism. The actuating mechanism is controlled by devices which tension the core and the tinsel served threads so that the operation of the apparatus is automatically stopped when the core or a tinsel served strand parts. The core and tinsel served threads pass from the faster revolving twisting mechanism into the other twisting mechanism, through a coiled spring which revolves at the speed of the faster revolving twisting mechanism and serves as an anti-friction device. The slower revolving twisting mechanism comprises a tubular arm adapted to carry the cores and tinsel served threads around an axis of rotation, the arm being so shaped that it does not frictionally engage the advancing core and tinsel served threads with any appreciable effect.

Other objects and features of the invention will become apparent as the following detailed description progresses, reference being had to the accompanying drawings wherein Fig. 1 is a front view of improved apparatus embodying the invention;

Fig. 4 is a sectional view taken on line 4—4 of Fig. 1;

Fig. 5 is a sectional view taken on line 5—5 of Fig. 3;

Fig. 6 is a sectional view taken on line 6—6 of Fig. 4;

Figure 1:
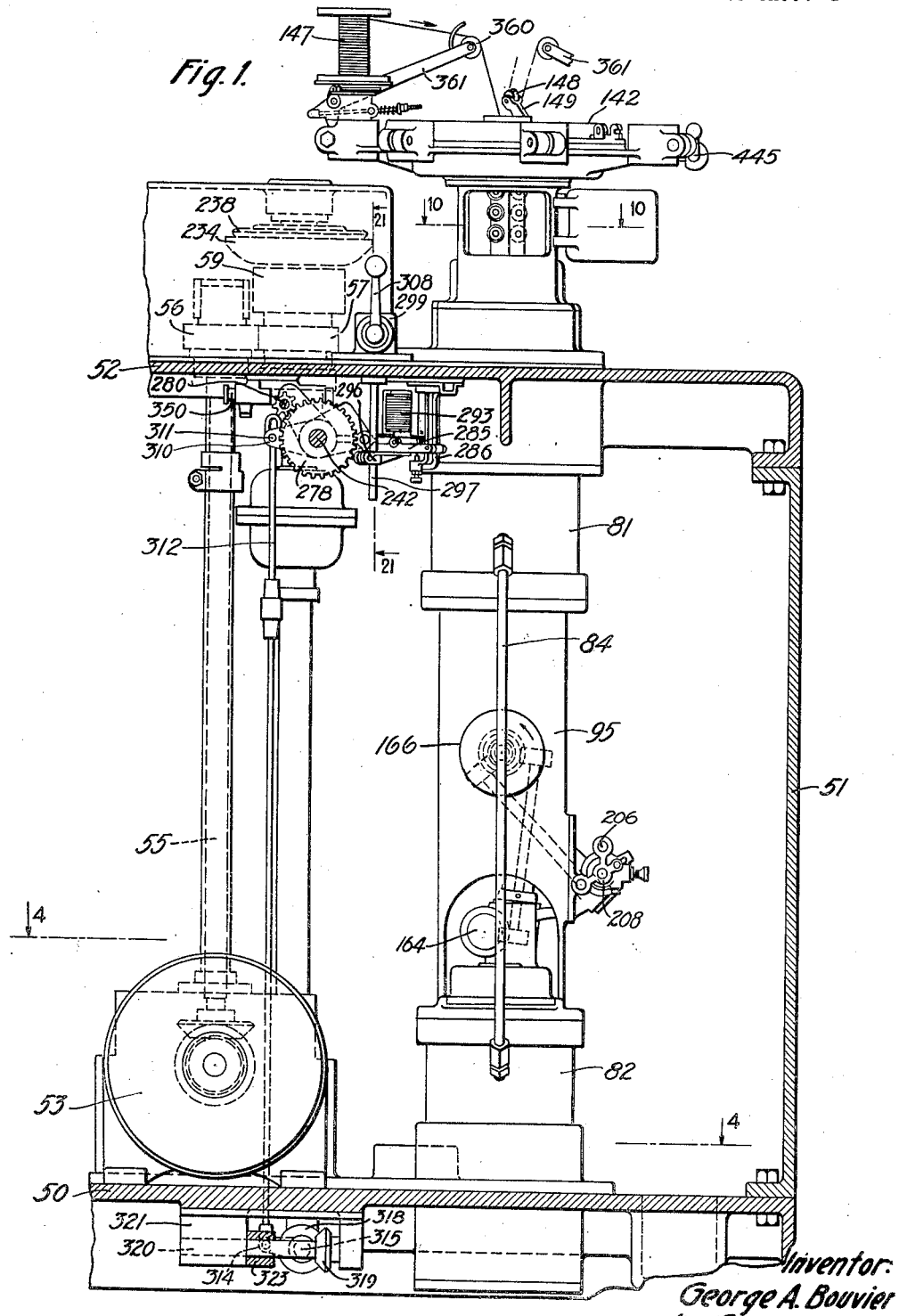
Figure 2:
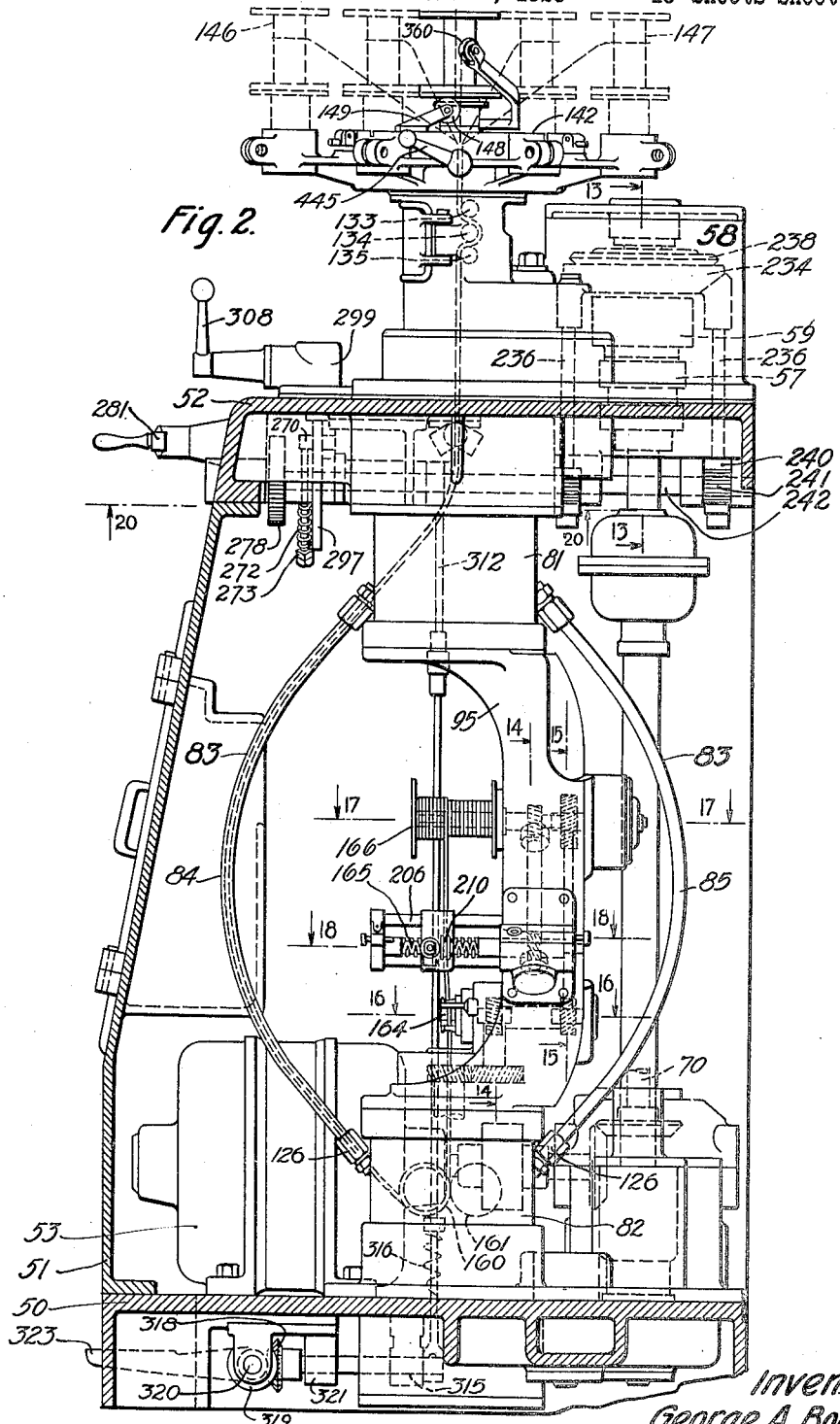
Fig. 2 is a side view of the improved apparatus.
Figure 3:
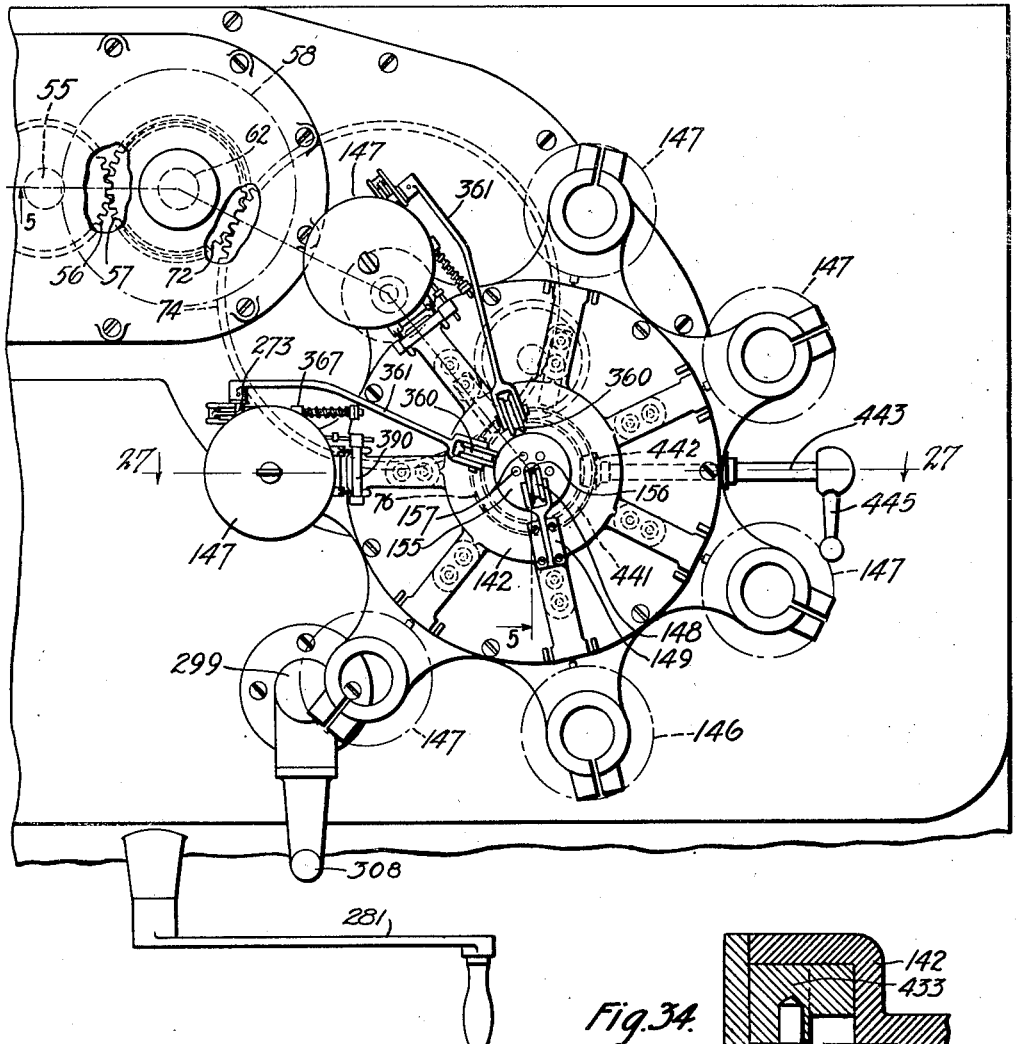
Fig. 3 is a plan view of the improved apparatus.
Figure 34:
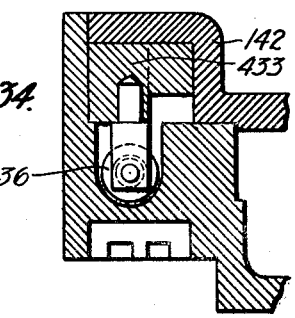
Figure 9:
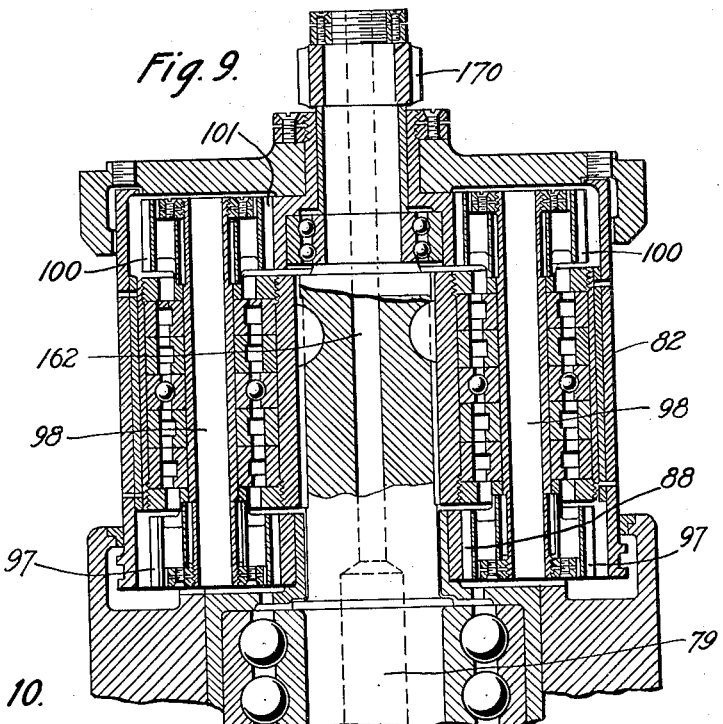
Figure 10:
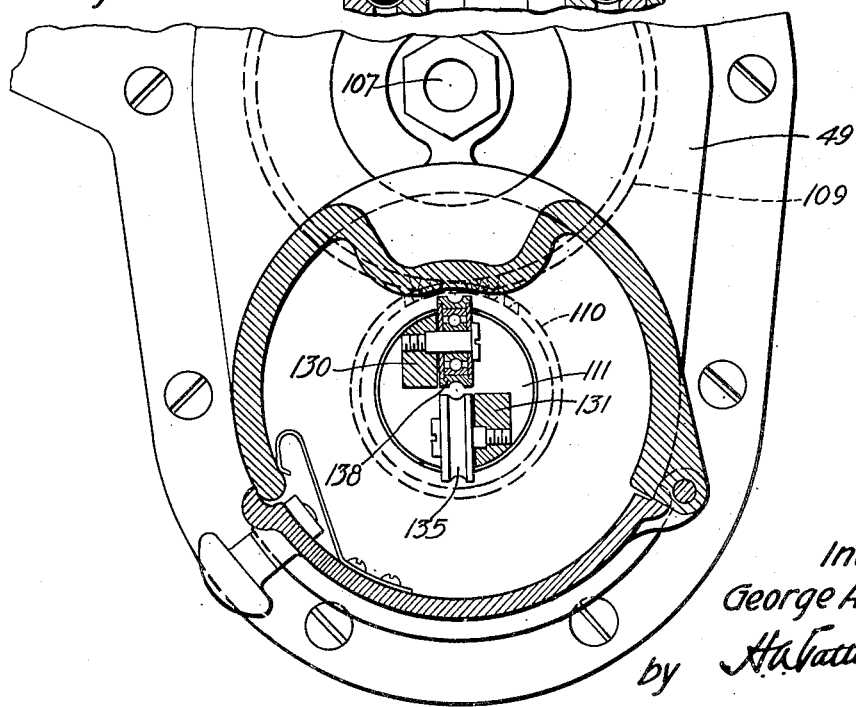
Figure 17:
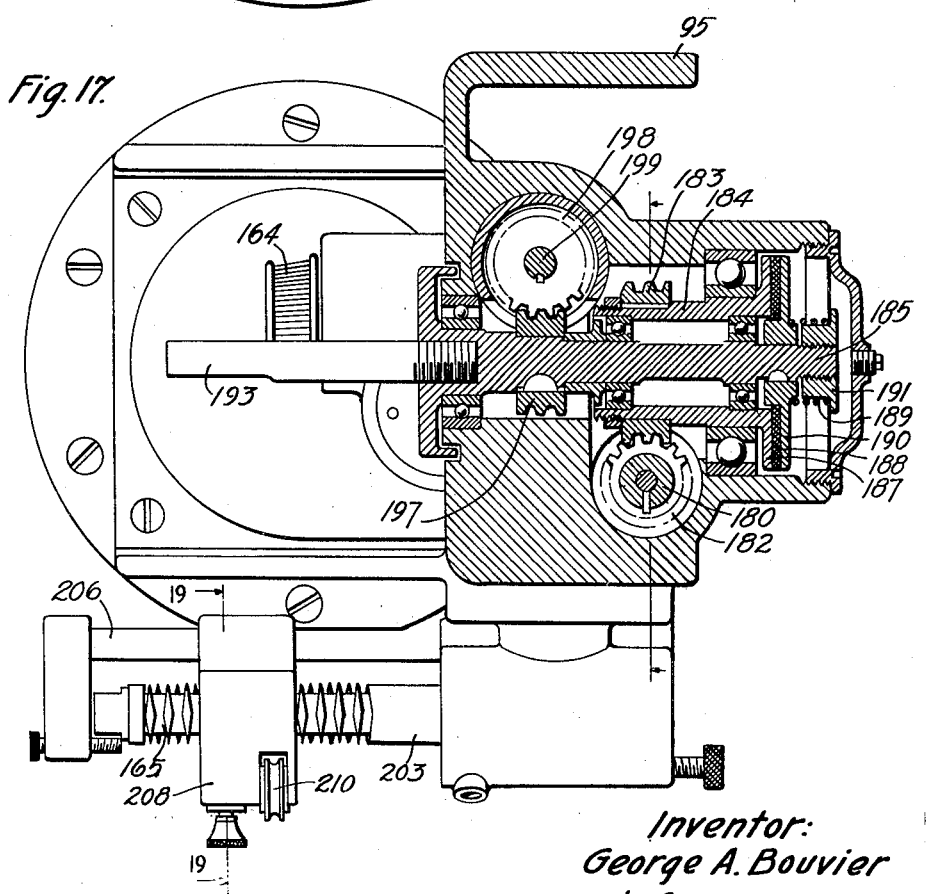

Fig. 7 diagrammatically shows the manner in which the improved apparatus applies tinsel covered thread to a cotton core;

Fig. 8 is a sectional view on line 8—8 of Fig. 5;

Fig. 9 is a sectional view on line 9—9 of Fig. 6;

Fig. 10 is a sectional view on line 10—10 of Fig. 1;

Fig. 11 is an enlarged fragmentary sectional view taken on substantially the same line as Fig. 5;

Fig. 12 is a sectional view on line 12—12 of Fig. 5;

Figs. 13, 14, 15, 16, 17 and 18 are sectional view on lines 13—13, 14—14, 15—15, 16—16, 17—17 and 18—18, respectively, of Fig. 2;

Fig. 19 is a sectional view taken on line 19—19 of Fig. 17;

Fig. 20 is a sectional view taken on line 20—20 of Fig. 2;

Fig. 21 is a sectional view taken on line 21—21 of Fig. 1;

Figs. 22 and 23 are sectional views on lines 22—22 and 23—23, respectively, of Fig. 21;

Fig. 24 is a sectional view on line 24—24 of Fig. 20;

Fig. 25 is a sectional view on line 25—25 of Fig. 22;

Fig. 26 is an enlarged fragmentary plan view of the improved apparatus;

Fig. 27 is a sectional view on line 27—27 of Fig. 3;

Fig. 28 is a fragmentary side view of apparatus for tensioning a strand which is to be twisted by the improved apparatus;

Fig. 29 is a sectional view on line 29—29 of Fig. 28;

Fig. 30 is a sectional view on line 30—30 of Fig. 29;

Figs. 31 and 32 are sectional views taken on lines 31—31 and 32—32, respectively, of Fig. 30;

Fig. 33 is a perspective view of a contacting member which forms a part of the improved apparatus;

Fig. 34 is a sectional view on line 34—34 of Fig. 26;

Fig. 35 shows a circuit forming a part of the improved apparatus;

Fig. 36 is a fragmentary sectional view corresponding to Fig. 11 and illustrating a different mounting for a helical spring adapted to guide the tinsel served threads and cotton core through the improved apparatus; and Fig. 37 is a sectional view on line 37—37 of Fig. 36.

Figure 13:
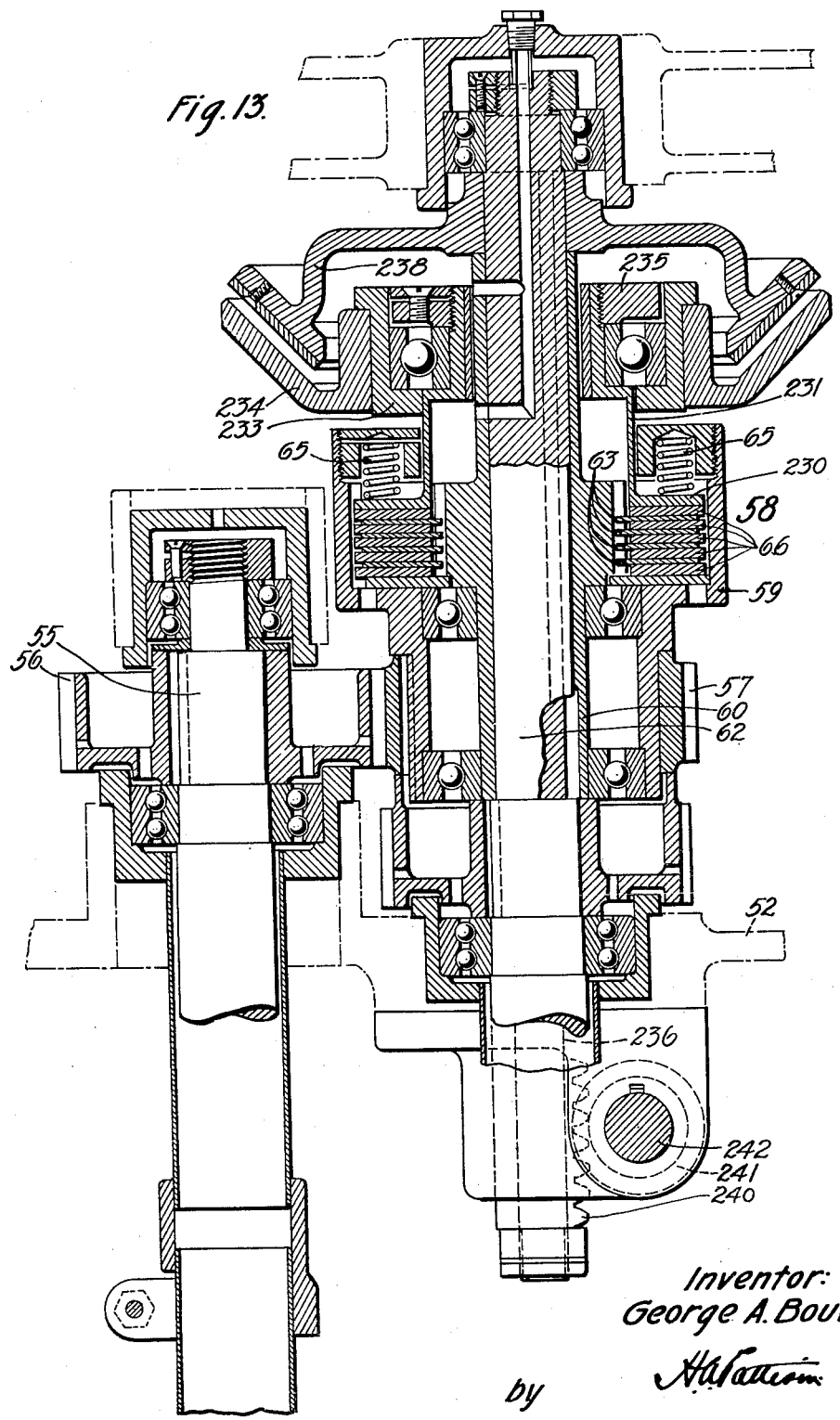

Referring to Figs. 1 to 6, inclusive, the improved apparatus is mounted in and upon a frame which comprises a base plate 50, a front wall 51 and a top plate 52. Mounted upon the base plate 50 is an electric motor 53 geared to a vertically disposed shaft 55 having a gear 56 secured to it (Fig. 13). The gear 56 meshes with a gear 57 keyed to a collar 59 which forms part of the driving element of a clutch 58 (Fig. 13) and is rotatably journaled upon a sleeve 60 forming part of the driven element of the clutch, the sleeve 60 being keyed to a vertically disposed shaft 62. Friction disks 63 arranged to rotate with the collar 59 are yieldably urged by compression springs 65 into frictional engagement with friction disks 66 arranged to rotate with the sleeve 60. The clutch is controlled by apparatus which is hereinafter described.

Disposed in axial alignment with the shaft 62 and constrained to rotate with it by a coupling 68 is a shaft 70 (Fig. 4). Keyed to the shafts 62 and 70 are gears 72 and 73, respectively, which mesh with the gears 74 and 75, respectively, the gears 74 and 75 being meshed with gears 76 and 77, respectively. The gears 76 and 77 are keyed to vertically disposed trunnions 78 and 79, respectively, which are disposed in axial alignment, and which carry heads 81 and 82, respectively, of a flyer 83 which also comprises tubular arms 84 and 85.

Referring now to Figs. 8 and 9, gears 87 and 88 which are held against rotation with respect to the top plate 52 and the base plate 50, respectively, have their axes disposed coincident with the common axis of the trunnions 78 and 79. Meshing with the gear 87 are gears 90 secured to shafts 91. Also secured to the shafts 91 are gears 92 meshing with a gear 93, which has its axis disposed coincident with the axis of the trunnion 78 and is rigidly secured to a yoke 95 disposed intermediate the heads 81 and 82, the heads being rotatable with respect to the yoke. Gears 97 meshing with the gear 88 are secured to shafts 98, the shafts 98 having secured thereto gears 100 which mesh with a gear 101 rigidly secured to the yoke 95. The shafts 91 and 98 are rotatably journaled in the heads 81 and 82, respectively, and are arranged to be carried bodily by the heads 81 and 82 around the common axis of rotation of the heads. The gears 87, 93, 101 and 88 all have a like number of teeth, and the gears 90, 92, 100 and 97 also have a like number of teeth. As the gears 87 and 88 are held against rotation, the yoke 95 remains stationary when the heads 81 and 82 are revolving.

Keyed to the trunnion 78 is a gear 105 meshing with a gear 106 rotatably journaled on a shaft 107 which is rigidly secured in the frame. Constrained to rotate with the gear 106 is a gear 109 meshing with a gear 110 formed integral with a tubular member 111 (Fig. 10), one end of which is rotatably journaled upon the trunnion 78, and the other end of which is rotatably journaled in the frame. The construction is such that the tubular member 111 will make two revolutions for each revolution of the trunnion 78. A tube 113 having one end keyed to the tubular member 111 projects downwardly into a bore 114 formed in the trunnion 78, the lower end of the tube being rotatably journaled within the trunnion and having rigidly secured to it a collar 116 (Fig. 11). Keyed in the collar 116 is a tubular section 118 having internal screw threads adapted to receive one end of a helical spring 120, the other end of the helical spring 120 being similarly threaded into a tubular section 121 keyed in a collar 122 which is rotatably journaled in a tube 123 secured in the head 81. The spring 120 and the tube 113 each makes one revolution around its longitudinal axis for each revolution of the tubular member 111.

As clearly shown in Figs. 5, 6 and 11, one end of each tubular arm 84 and 85 is secured to the head 81 by a tube 123, and the other end thereof is secured to the head 82 by a tube 123 of substantially identical construction, each end of each tubular arm 84 and 85 being provided with a flange 125 which is engaged by a nut 126 threaded upon the associated tube 123. While a plurality of tubular arms 84 and 85 are shown, functional use is made of only one of the arms, as for instance the arm 84, the arm 85 being provided to balance the arm 84 dynamically.

The tubular member 111 is cut away intermediate its ends to provide two posts 130 and 131 (Figs. 5 and 10). Rotatably journaled upon the post 131 are three sheaves 133, 134 and 135, and rotatably journaled upon the post 130 are three sheaves 136, 137 and 138, all of the sheaves being substantially identical in form. Either set of sheaves may be employed during the operation of the apparatus, one set being provided to dynamically balance the other.

The upper end of the tubular member 111 is rotatably journaled in a tubular portion 140 of the frame, upon which is rotatably journaled a hub 141 of a spider 142 having arms 143. Clamped in the outer end of each arm 143 is a cage 144 (Fig. 27) in which is rotatably journaled a spindle 145 carrying a removable supply reel. As shown seven supply reels are provided, six of the supply reels being adapted to hold tinsel served threads and one of the supply reels being adapted to hold a supply of cotton core. The supply reel which holds the cotton core is identical in construction with the several supply reels which hold the tinsel served threads, but for the purposes of this explanation it is identified by the reference character 146 and is shown in Fig. 3, the other supply reels being identified by the reference character 147. Aligned with the cotton supplying reel 146 is a sheave 148 mounted on a bracket 149 carried by the spider 142. Secured to each spindle 145 is a disk 150 having a pin 151 adapted to enter an aperture in the flange of the associated supply reel so that the spindle will rotate with the supply reel. A cylindrical brak'ng surface 152 is provided upon each disk 150 for a purpose which will presently appear.

Seated in the upper end of the tubular portion 140 is a plate 155 having a bore 156, the axis of which is coincident with the axis of the trunnion 78. Equi-distantly spaced from the bore 156 and from each other are six bores 157 in the plate 155, each bore 157 being provided with a hardened steel bushing 158. In the operation of the machine, the cotton core is passed through the bore 156 and the tinsel served threads are passed through the bushings 158.

Rotatably journaled in the head 82 and diametrically disposed with respect to the axis thereof are two sheaves 160 and 161 in line with the tubular arms 84 and 85, respectively, the sheave 161 being provided to balance the sheave 160 dynamically. It will be noted that the sheaves 160 and 161 are aligned with a central bore 162 formed in the trunnion 79.

A capstan 164 aligned with the bore 162 is carried by the yoke 95. Disposed above the capstan 164 and carried by the yoke 95 is a strand distributing device 165 which is employed to distribute the finished product upon a take-up reel 166 removably mounted upon the yoke 95.

Figure 16:
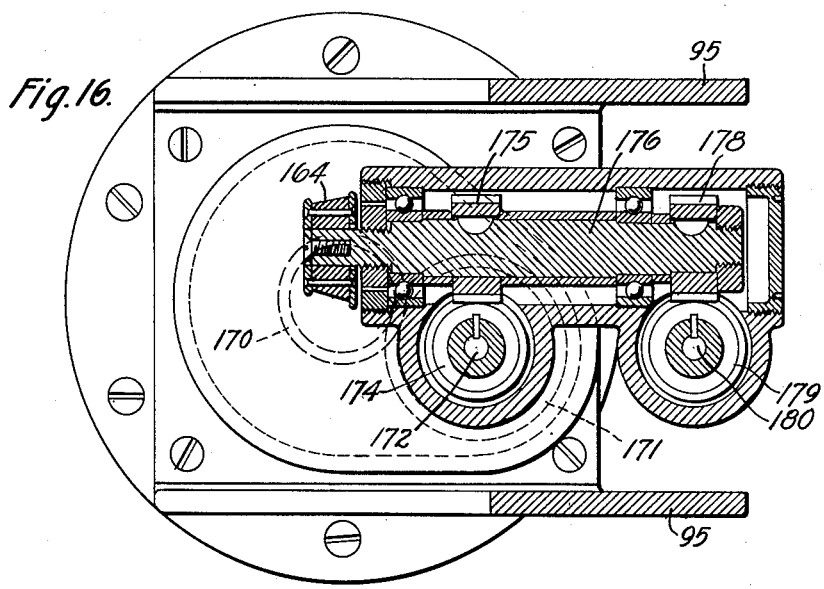

Rigidly secured to the upper end of the trunnion 79 is a gear 170 meshing with a gear 171 secured to a shaft 172 rotatably journaled in the yoke 95 (Figs. 6 and 14). Keyed to the shaft 172 is a spiral gear 174 meshing with a spiral gear 175 keyed to a shaft 176. The shaft 176 is rotatably journaled in the yoke 95 and has the capstand 164 rigidly secured to one of its ends (Fig. 16). A spiral gear 178 keyed to the shaft 176 meshes with a spiral gear 179 keyed to a shaft 180 which is journaled in the yoke 95 and has keyed to it a second spiral gear 182 which meshes with a gear 183 keyed to a sleeve 184 rotatably journaled upon a shaft 185 which is in turn rotatably journaled in the yoke 95 (Fig. 17). A flange 187 formed integrally with the sleeve 184 is engaged by a friction disk 188 which is yieldingly urged against the flange 187 by a spring 189, the spring 189 having one of its ends bearing against a disk 190 and having the other of its ends bearing against a nut 191 threaded upon the shaft 185. The disk 190 is keyed to the shaft 185. This construction permits the sleeve 184 to drive the shaft 185 at a variable speed. A spindle 193 projecting from one end of the shaft 185 is adapted to accommodate the take-up reel 166, any suitable means being provided to detachably secure the take-up reel to the spindle.

A spiral gear 197 keyed to the shaft 185 meshes with a spiral gear 198 keyed to a shaft 199 which is rotatably journaled in the yoke 95. Keyed to the shaft 199 is a spiral gear 201 (Fig. 14) which meshes with a spiral gear 202 keyed to a shaft 203 journaled in the yoke 95. The shaft 203 forms part of the strand distributing device 165 which also comprises pins 206 projecting from the yoke 95 (Figs. 18 and 19). Slidably mounted upon the pins 206 and the shaft 203 is a carriage 208 in which is rotatably journaled a sheave 210. Slidably and rotatably journaled in the carriage 208 is a pin 212 which is yieldingly held by a spring 213 in a position wherein a lug 215 formed upon the pin operatively engages either one or the other of intersecting right and left-hand screw threads 217 and 218, respectively, formed in the shafts 203. The shaft 203, when rotated, causes the lug 215 to alternately traverse the screw threads 217 and 218 in such a manner that the carriage 208 is reciprocated.

Referring now to Fig. 13, the springs 65 bear against a flange 230 formed upon an annular member 231 which is slidably and rotatably journaled upon the sleeve 60 and rotatably journaled in a collar 233 rigidly secured to a brake member 234. A nut 235 threaded upon the sleeve 60 prevents longitudinal displacement of the annular member 231 relative to the sleeve. Projecting downwardly from the brake member 234 are posts 236 which are slidably journaled in the frame and prevents rotation of the brake member 234 around the axis of the shaft 62, permitting the brake member 234 to be brought into and out of engagement with a brake member 238 keyed to the shaft 62 (Fig. 2). Disposed around the posts 236 are compression springs 239 (Fig. 21) which urge the posts 236 upwardly. The springs 239 are of sufficient strength to overcome the action of the springs 65 so that they may bring the brake member 234 into engagement with the brake member 238 and prevent the friction disks 63 from driving the friction disks 65. Each post 236 terminates in a rack 240 which meshes with a gear 241 keyed to a shaft 242 journaled in the frame. It is obvious that the shaft 242 may be rotated against the action of the spring 239 to bring the brake member 234 out of contact with the brake member 238 and to permit the spring 65 to urge the friction disks 66 into driving engagement with the friction disks 63.

As best shown in Figs. 2 and 21, one end of the shaft 242 is rotatably journaled in the front wall 51 and in a bracket 250 secured to the under side of the top plate 52. Secured to the shaft 242 is a plate 252 having a notch 253 (Fig. 22) engagable by a pawl 254 which is pivotally mounted on a pin 255 journaled in the bracket 250. A leaf spring 257 yieldingly urges the pawl 254 into a position wherein it will engage the notch 253. The springs 239 tend to rotate the shaft 242 in a counter-clockwise direction (Fig. 22), and this rotation is prevented by the pawl 254 when it engages the notch 253. The construction is such that when the notch 253 is engaged by the pawl 254 the friction disks 63 will be yieldingly held in driving engagement with the friction disks 66 and the brake member 234 will be disengaged from the brake member 238. Disengagement of the pawl 254 from the notch 253 will result in engagement of the brake member 238 by the brake member 234 and the driving engagement between the friction disks 63 and 66 will be broken.

Secured to a sleeve 260 which is rotatably journaled on the shaft 242 is a collar 262 having a laterally extending lug 263 engageable with a shoulder 264 formed upon the plate 252 (Fig. 20). A lever 265 having bifurcations 266 is secured to the sleeve 260. Pivoted in the bifurcations 266 is a pin 268 through an aperture of which a pin 269 passes, the axis of the pin 269 being disposed at right angles to the axis of the pin 268. One end of the pin 269 is rigidly secured in a pin 270 pivotally mounted in the frame. A compression spring 272 wound around the pin 269 has one end thereof bearing against a nut 273 threaded upon the pin 269 and has the other end thereof bearing against a collar 274 slidably mounted upon the pin 269 and arranged to engage the pin 268. The spring 272 yieldingly urges the pin 268 upwardly along the pin 269 and tends to rotate the sleeve 260 in a counter-clockwise direction (Fig. 22), displacement of the sleeve 260 in this direction being limited by a nut 276 threaded upon the pin 269. A gear 278 which is keyed to the sleeve 260 meshes with a pinion 279 keyed to a shaft 280 journaled in the front wall 51, the shaft 280 having one end projecting through the wall (Fig. 20). Pinned to the outer end of the shaft 280 is a crank 281 which may be employed to rotate the sleeve 260 in a clockwise direction (Fig. 22) against the action of the spring 272 when the notch 253 is to be engaged by the pawl 254. Thus if the pawl 254 is first disengaged from the notch 253 the springs 236 will rotate the shaft 242 in a counter-clockwise direction (Fig. 22) when they terminate the driving engagement between the friction disks 63 and 66 and the shoulder 264 will be driven toward the lug 263. If the sleeve 260 is rotated in a clockwise direction (Fig. 22), it will cause the lug 263 to bring the plate 252 into the position wherein its notch 253 will be engaged by the pawl 254.

As clearly shown in Fig. 22, the pawl 254 is engageable by a screw 284 adjustably mounted in a lever 285 which is pivotally mounted on a bracket 286 secured to the under side of the top plate 52, displacement of the lever 285 in a clockwise direction (Fig. 22) being limited by a screw 288 threaded into the bracket. The construction is such that if the free end of the lever 285 is moved upwardly the screw 284 will disengage the pawl 254 from the notch 253. Pivotally secured to the lever 285 by a pin 290 is an armature 291 of a solenoid 293 mounted on the frame. Means, hereinafter described, is provided for energizing the solenoid 293 so that it will attract its armature 291 and cause the screw 284 to disengage the pawl 254 from the notch 253.

Disposed beneath the free end of the lever 285 is one end of an arm 296 which has its other end clamped upon a rod 297 depending from a plunger 298 which is slidably journaled in a bracket 299 mounted upon the upper surface of the top plate 52 (Figs. 21 and 23). A compression spring 301 interposed between the plunger 298 and the bracket 299 yieldingly holds the arm 296 in a position wherein it permits the lever 285 to rest against the screw 288. Projecting into a slot 303 formed in the plunger 298 is a tongue 305 formed integrally with a shaft 307 which may be oscillated by a handle 308. If the shaft 307 is rotated in either direction, the tongue 305 will raise the plunger 298 and cause the arm 296 to in turn raise the lever 295. This will, of course, cause the pin 294 to disengage the pawl 254 from the notch 253.

Secured to the shaft 242 is a lever 310, the free end of which is connected by a pin 311 to a rod 312 having a slot 313 through which the pin 311 passes (Figs. 20 and 22). The rod 312 is pivotally connected to a lever 314 secured to a shaft 315 which is journaled in brackets forming part of the frame. A compression spring 316 yieldingly holds the rod 312 in a position wherein the slot 313 permits the shoulder 264 to be brought against the lug 263 without accompanying displacement of the rod 313. A bevel gear 318 secured to the shaft 315 meshes with a bevel gear 319 secured to a shaft 320 journaled in bearing blocks 321 mounted upon the base plate 50. Secured to the shaft 320 is a foot treadle 323. The foot treadle 323 may be depressed to rotate the shaft 242 in a clockwise direction (Fig. 22) to bring the plate 252 into the position wherein its notch 253 will be engaged by the pawl 254, the motion of the foot treadle being imparted to the shaft 242 through the gears 318 and 319, the rod 312 and the lever 310.

Secured to the shaft 242 is a lever 325, the free end of which is connected by a link 326 to a tubular member 328 slidably journaled upon a pin 329, this pin being slidably journaled in a bracket 331 secured to the under surface of the top plate 52. Interposed between the tubular member 328 and a nut 334 which is threaded upon the pin 329 is a compression spring 335 which yieldingly urges the tubular member against a shoulder 336 formed upon the pin. Secured around the pin 329 and electrically insulated therefrom is a metallic ring 338 engageable by brushes 340 and 341 slidably mounted in and insulated from a bracket 343 secured to the under surface of the top plate 52 (Fig. 25). When the ring 338 is in the position wherein it is shown in Fig. 22, the brushes 340 and 341 are yieldingly held in contact with the ring by compression springs 344 and 345. Binding posts 347 and 348 connect the brushes 340 and 341, respectively, into a circuit which is shown in Fig. 35. Secured to the pin 329 is a collar 350 which comprises an annular flange 351 and has two cylindrical surfaces 352 and 353, the cylindrical surface 352 having a diameter greater than that of the ring 338, and the cylindrical surface 353 having a diameter substantially equal to that of the ring 338. Intermediate the cylindrical surfaces 352 and 353 is an annular shoulder 354 engagable by a lug 356 formed upon a plunger 357 which is slidably mounted in the bracket 343 and is urged toward the collar 350 by a compression spring 359. If the shaft 242 is rotated in a counter-clockwise direction (Fig. 22) the link 325 will move the tubular member 328 to the left and the pin 329 will be yieldingly urged to the left by the spring 335. The lug 356 engaging the shoulder 354 will prevent movement of the pin 329 until sufficient energy has been stored in the spring 335 to overcome the force with which the spring 359 holds the lug 356 in engagement with the shoulder 354. The spring 359 will then yield and the pin 329 will be snapped into a position wherein the ring 338 will be disengaged from the brushes 340 and 341. The movement of the pin 329 to the left (Fig. 22) is limited by the flange 251 which is adapted to engage the bracket 343. The pin 329 is restored to the position wherein the ring 338 registers with the brushes 340 and 341 whenever the shaft 242 is rotated in a clockwise direction (Fig. 22). The purpose of this construction will presently appear.

Referring now to Figs. 26, 27 and 28 the clutch 58 is controlled through the solenoid 293 by seven strand tensioning devices, each of which comprises a sheave 360 mounted on the free end of a lever 361 which is secured to a pin 362 pivotally mounted in the cage 144 with which the particular sheave is associated. Each strand tensioning device also comprises a brake band 363 yieldingly urged into frictional engagement with the associated braking surface 152 by compression springs 364 which are disposed around rods 365 and 366. Each spring 364 is interposed between a nut 367 threaded upon its associated rod 365 or 366 and a lug 368 which is formed integrally with the brake band 363 and through which the rod passes. Secured upon each rod 365 and 366 is a collar 369 engageable with the brake band 363 to bring it out of effective engagement with the braking surface 152 whenever the rods 365 and 366 are displaced toward the center of the spider 142. The rod 365 is pivotally secured to a bifurcated lever 370 secured to the pin 362. The rod 366 is pivotally secured to a bifurcated arm 373 of a lever 374 which also comprises bifurcated arms 375 and 376, the lever 374 being secured to the pin 362. Pivotally secured to each arm 375 is a rod 377 which is slidably journaled in a head 379 formed on a pin 380, the pin 380 being pivotally mounted in the associated cage 144. Disposed around the rod 377 and interposed between the head 379 and a nut 385 threaded upon the rod is a compression spring 384 which tends to rotate the lever 374 in a clockwise direction (Fig. 28) so that the springs 364 will be compressed and will cause the brake band 360 to bear against the braking surface 152 with increased pressure. The spring 384 is of sufficient strength to over come the action of the springs 364 associated therewith, the springs 364 tending to rotate the associated lever 374 in a counter-clockwise direction (Fig. 28). Pivotally secured to each arm 376 is a rod 386 which is slidably journaled in a head 387 formed upon a pin 388 journaled in a dog 390, the dog 390 being pivotally mounted by pins 392 upon a cap 395 secured to the spider 142. Secured to the rod 386 is a collar 394 engageable with the head 387. If the associated lever 374 is angularly displaced in a clockwise direction (Fig. 28) the collar 394 will engage the head 388 and angularly displace the dog 390 in the opposite direction against the action of compression springs 397 interposed between the spider 142 and arms 399 formed integrally with the dog 390. The dog 390 comprises a hardened steel pin 400 engageable with a shoulder 401 formed upon a plunger 402 which is slidably journaled in a bushing 406 threaded into the cap 395, the plunger being radially disposed with respect to the axis of rotation of the spider 142. Threaded into the inner end of the plunger 402 is a pin 407 which is also radially disposed with respect to the axis of rotation of the spider 142 and is provided with a head 408 at its inner end. Interposed between the head 408 and the plunger 402 are metallic rings 410 and 411 disposed around the pin 407 and insulated therefrom. The metallic rings 410 and 411 are electrically connected to each other by a metallic tube 412 also disposed around the pin 407. A compression spring 413 wound around the inner end of the plunger 402 yieldingly urges the plunger toward the axis of rotation of the spider 142 and unless the shoulder 401 is engaged by the pin 400, the spring 413 will bring the plunger 402 into a position wherein the metallic rings 410 and 411 will be engaged by brushes 415 and 416, respectively. The brushes 415 and 416 are provided with binding posts 418 and 419, respectively. As shown in Fig. 32 one of the binding posts 418 is electrically connected to a collector ring 420 by a spring clip 421 (Fig. 33) which is rigidly secured to the binding post and contacts a spring clip 422 rigidly secured to the collector ring. As shown in Fig. 31 one of the binding posts 419 is electrically connected to a collector ring 425 by a spring clip 426 which is rigidly secured to the binding post and contacts with a spring clip 427 rigidly secured to the collector ring. This construction permits this portion of the apparatus to be assembled easily and quickly. The collector rings 420 and 425 are secured to and insulated from the spider 142 and are engaged by brushes 430 and 431, respectively, the brushes 430 and 431 being secured in the frame (Figs. 5 and 35). The heads 408 are aligned with a cam member 433 rotatably mounted upon the spider 142 and provided with seven cam surfaces 434, a cam surface 434 being provided for each of the heads 408. A compression spring 436 interposed between the cam member 433 and the spider 152 tends to hold the cam member in a position wherein a shoulder 438 formed upon the cam member will rest against a pin 439 projecting from the spider 142. When the cam member 433 is in this position, the cam surfaces 434 are so positioned with respect to the heads 408 that if one of the pins 400 is disengaged from the associated shoulder 401, the plunger 402 will be brought into a position wherein the metallic rings 410 and 411 associated therewith will be engaged by the associated brushes 415 and 416. Formed integrally with the cam member 433 is a segmental gear 441 which meshes with a bevel gear 442 secured to a shaft 443. The shaft 443 is rotatably journaled in the spider 142 and is provided with a handle 445 (Fig. 3). The operator may rotate the shaft 443 by means of the handle 445 to cause the bevel gear 442 to angularly displace the cam member 433 in a counter-clockwise direction (Fig. 26) against the action of the spring 436. Then if one of the plungers 402 is in a position wherein the associated metallic rings 410 and 411 are engaged by the associated brushes 415 and 416, the associated head 408 will be engaged by one of the cam surfaces 434 and will be brought into a position wherein the shoulder 401 formed upon the plunger can again be engaged by the associated pin 400. After the shoulder 401 has been engaged by the pin 400, the handle 445 may be released and the spring 436 will restore the cam member 433 to the position wherein its shoulder 438 bears against the pin 439.

Referring to Fig. 35 and as above described, one of the brushes 415 is electrically connected to the collector ring 420 by spring clips 421 and 422 and one of the brushes 416 is electrically connected to the collector ring 425 by spring clips 426 and 427. The remaining brushes 415 and 416 are connected in parallel to these brushes in such manner that should any pair of brushes 415 and 416 be engaged by their associated metallic rings 410 and 411, the collector ring 420 will be electrically connected to the collector ring 425. The brush 430 is connected to the brush 341 and the brush 340 is connected to one terminal of the solenoid 293. Connected to the brush 431 and to the other terminal of the solenoid 293 are mains 450 and 451, respectively, which lead from any suitable source (not shown) of electrical energy.

The tubular arm 84 is formed to correspond to a previously computed curve which a flexible strand would assume if its ends were secured to spaced points on an axis of rotation and the strand were rotated bodily around the axis. The tubular arm 84 is assembled in the apparatus in such manner that its longitudinal axis is coincident with the path the cotton core tends to travel as it passes through the flyer 83. This construction is advantageous as the retarding effect of frictional engagement between the tinsel serve threads and the arm 84 is reduced to a minimum. The arm 85 is similar to the arm 84 in form so that it may be used in place thereof.

In the operation of the above described apparatus, a supply reel 146 holding the cotton core and six supply reels 147 holding tinsel served threads are placed upon the spindles 145, the supply reel 146 being placed upon that spindle 145 which is aligned with the sheave 149. The cotton core is passed over the sheave 360 aligned therewith, over the sheave 148 and through the aperture 156. The tinsel served threads are passed over the sheaves 360 aligned therewith and through the bushings 158. As diagrammatically shown in Fig. 7, the cotton core and tinsel served threads after being passed through the aperture 156 and the bushings 158, respectively, are trained over the sheave 133 and guided thereby to the sheave 134, the core and tinsel served threads passing halfway around and behind the sheave 134 to the sheave 135 which guides them to the axis of rotation of the flyer 83. The core and tinsel served threads are then passed through the tube 113, the spring 120, the tubular arm 84, around the sheave 160 and through the bore 162 to the capstan 164. The core and tinsel served threads are wrapped around the capstan 164 several times and are then led over the sheave 210 to the take-up reel 166. The motor 53 is then connected to any suitable source (not shown) of electrical energy so that it will drive the friction disks 63 continuously. The friction disks 66 are then brought into driving engagement with the friction disks 63 by depressing the foot pedal 323 to rotate the shaft 242 in a clockwise direction (Fig. 22) or by operating the crank 281 to rotate the shaft 242 in that direction. Such rotation of the shaft 242 will bring the notch 253 into a position wherein it will be engaged by the pawl 254. The friction disks 66 will then be held in driving engagement with the friction disks 63 until the pawl 254 is disengaged from the notch 253. The driving engagement between the friction disks 66 and 63 results in rotation of the flyer 83 and the tubular member 111 around their common axis, the tubular member 111 being rotated at twice the speed of the flyer and in the same direction. As described above, the spring 120 revolves around its longitudinal axis at a speed equal to the speed of the tubular member 111. The core and tinsel served threads are advanced through the tubular member 111 and the flyer 83 by the capstan 164 and they are delivered by the capstan to the sheave 210 of the strand distributing device 165 which distributes them upon the take-up reel 166. As the core and tinsel served threads pass through the apparatus, each tinsel served thread is twisted twice around the cotton core for each revolution of the flyer 83, i. e., two turns of each tinsel served thread are served to the cotton core for each revolution of the flyer 83, each portion of the cotton core being rotated twice around its longitudinal axis as it passes through the apparatus. The apparatus tends to twist each section of cotton core in the manner described and tends to apply the two turns of each tinsel served thread to the core before the core and tinsel covered threads travel over the sheave 133. This is partly due to the improved form of the arm 84 and is partly due to the provision of the spring 120 which makes the proper number of revolutions around its own longitudinal axis as compared with the number of revolutions made by the flyer so that the normal tendency of any section of core passing into the arm 84 to make two revolutions around its own axis for each revolution of the flyer is not retarded. Assuming that the proper number of turns of tinsel served thread are applied to each section of the core before it travels over the sheave 133, any tendency of the arm 84 to unwrap these turns will be negatived when the section of core passes from the sheave 160 to the capstan 164 as the turns will again be tightened around the core. However, the sheaves 133, 134 and 135 may be said to be one twisting means and the flyer 83 a second twisting means. The product of the apparatus is wound upon the take-up reel 166 which may be replaced when full. To stop the apparatus, the motor 53 may be disconnected from the source (not shown) of electrical energy, or the handle 308 may be rotated to disengage the pawl 254 from the notch 253 which will terminate the driving engagement between the friction disks 63 and 66.

When the apparatus is properly applying the tinsel served threads to the cotton, the tension on the tinsel served threads and on the cotton core holds the levers 361 in positions wherein the springs 397 are permitted to hold the pins 400 in engagement with the shoulders 401. If the cotton core or one of the tinsel covered threads should part, the spring 384 associated therewith would bring its respective brake band 363 into frictional engagement with the associated braking surface 152 so that the respective supply reel 146 or 147 will not continue to unwind. Simultaneously the spring 384 will cause the collar 394 to rotate the associated dog 390 in such manner that its pin 400 will be withdrawn from the shoulder 401 of the associated plunger 402 which will move into a position wherein its metallic rings 410 and 411 will engage the brushes 415 and 416. Electrical current will then flow in a circuit which may be traced as follows: From the main 450, through the brush 431, the collector ring 425, the last-mentioned brushes 416 and 415, the collector ring 420, the brush 430, the brush 341, the metallic ring 338, the brush 340, and through the winding of the solenoid 293 to the main 451 (Fig. 35). The solenoid 293, then energized, attracts its armature 291 and causes the screw 284 to disengage the pawl 254 from the notch 253, whereupon the driving engagement between the friction disks 63 and 66 is terminated and the twisting apparatus is brought to a full stop. When the pawl 254 is thus disengaged from the notch 253, the metallic ring 338 is withdrawn from between the brushes 340 and 341 so that current will not continue to flow through the above described circuit after the twisting apparatus has ceased to function.

Referring to Fig. 36, 460 is a spring which may be employed in place of the spring 120 of the above described apparatus. The spring 460 is shown in connection with a trunnion 461 and a tubular member 462 which may be employed in place of a trunnion 78 and one of the tubular members 123, respectively, shown in the above described apparatus. Rotatably journaled in the trunnion 461 is a tube 464 which has the same function as the tube 113 and has rigidly secured to it at its lower end a sleeve 465 seated in a recess 466. Formed in the lower end of the sleeve 465 is a collar 468 having integral keys 469 adapted to engage keyways formed in the sleeve (Fig. 37). One end of the spring 460 is soldered or otherwise secured in the collar 468 and the other end thereof is soldered or otherwise secured in a collar 473 seated in the recess 474 which is formed in a sleeve 475, the collar 473 being provided with keys 477 to engage keyways 478 formed in the sleeve 475. The sleeve 475 is rotatably journaled by ball bearings 480 and 481 seated in the tubular member 462. This construction permits the spring 460 to be quickly replaced whenever it becomes necessary to do so as the collars 468 and 473 may be quickly and easily withdrawn from the sleeves 465 and 475, the spring 460 yielding to permit such withdrawal of the collars from the sleeves. A second spring 460 having collars 468 and 473 secured thereto may then be inserted.

What is claimed is:

1. In stranding apparatus, a rotatable rigid member for guiding a strand, the member being shaped to guide the strand through a path conforming to the curve which a strand assumes when its ends are fixed to spaced points on an axis of rotation and it is rotated bodily around the axis.

2. In stranding apparatus, a plurality of strand twisting means arranged seriatim to rotate around a common axis of rotation, and means for advancing the strand through the strand twisting means, the strand advancing means being arranged to engage the strand after it has passed seriatim through the strand twisting means.

3. In stranding apparatus, means for twisting a strand, means for rotating a twisted strand bodily around an axis of rotation, a resilient member for guiding the twisted strand, and means for rotating the resilient member around the twisted strand to insure the retention of twists previously introduced therein.

4. In stranding apparatus, means for twisting a strand, means for rotating a twisted strand bodily around an axis of rotation, a helical spring for guiding the twisted strand, and means for rotating the helical spring around the twisted strand to insure the retention of twists previously introduced therein.

5. In stranding apparatus, means for rotating a strand around its longitudinal axis to introduce a twist therein, resilient means for guiding the twisted strand, and means for rotating the resilient means around the twisted strand to insure the retention of twists previously introduced therein.

6. In stranding apparatus, a frame, strand twisting means rotatably journaled upon the frame, a support rotatably mounted on the frame and having an axis of rotation coincident with the axis of rotation of the strand twisting means, and means carried by the support for carrying a plurality of reels.

7. In stranding apparatus, a frame, strand twisting means rotatably journaled upon the frame, a support rotatably mounted on the frame and having an axis of rotation coincident with the axis of rotation of the strand twisting means, means carried by the support for carrying a plurality of reels, and strand tensioning means carried by the support.

8. In stranding apparatus, a frame, a plurality of strand twisting means rotatably mounted upon the frame, means for causing relative motion between the strand twisting means, and means mounted within one of the strand twisting means for carrying a take-up reel.

9. In stranding apparatus, a plurality of rotatable strand twisting means, means mounted within one of the strand twisting means for mounting a take-up reel, and means for causing relative motion between the strand twisting means, and between the strand twisting means and the last-mentioned means.

10. The method of serving a strand to a core, which consists in rotating a portion of the core around its longitudinal axis to introduce a plurality of twists therein, delivering the strand to the rotating portion of the core, and rotating another portion of the core bodily around an axis of rotation to insure the retention of a predetermined number of twists therein.

11. The method of twisting strands, which consists in rotating a portion of one of the strands around its longitudinal axis to introduce a predetermined number of twists therein, and simultaneously rotating another portion of said strand bodily around an axis of rotation in alignment with the longitudinal axis of the first portion of the strand to insure the retention of the same number of twists previously introduced therein.

12. The method of serving a strand to a core, which consists in advancing the core, rotating a portion of the core around its longitudinal axis to introduce a predetermined number of twists therein, delivering the strand to the rotating portion of the core, and simultaneously rotating another portion of the core bodily around an axis of rotation in alignment with the longitudinal axis of the first portion of the core to insure the retention of the same number of twists previously introduced therein.

13. The method of serving a strand to a core, which consists in rotating a portion of the core around its longitudinal axis to introduce a predetermined number of twists therein, delivering a strand to the rotating portion of the core, advancing the portion of the core thus twisted, and then rotating said portion bodily around an axis of rotation to insure the retention of the same number of twists previously introduced therein.

14. The method of twisting strands, which consists in rotating a portion of one of the strands around its longitudinal axis to introduce a plurality of twists therein and simultaneously rotating another portion of said strand bodily around an axis of rotation in alignment with the longitudinal axis of the first portion of the strand in such manner that two previously introduced twists are retained in the first portion for each revolution that the second portion is carried bodily around the axis of rotation.

15. In stranding apparatus, means for rotating a strand around its longitudinal axis to introduce a predetermined number of twists therein, means for rotating the twisted strand bodily around an axis of rotation to insure the retention of the same number of twists previously introduced therein, means for guiding the twisted strand, and means for rotating the guiding means around the twisted strand to insure the retention of the previously introduced twists.

16. The method of serving a strand to a core, which consists in rotating a portion of the core around its longitudinal axis, delivering the strand to the rotating portion of the core in such manner that a plurality of turns of the strand are applied thereto, and simultaneously rotating another portion of the core bodily around an axis of rotation in such manner that a predetermined number of previously applied turns of the strand are retained on the core for each revolution that the core is carried bodily around the axis of rotation.

In witness whereof, I hereunto subscribe my name this 23 day of December, A. D., 1925.

GEORGE ALFRED BOUVIER.